US010016097B2

(12) United States Patent
Santoro et al.

(10) Patent No.: US 10,016,097 B2
(45) Date of Patent: Jul. 10, 2018

(54) DISPENSER ASSEMBLY

(71) Applicant: Vi-Jon, Inc., St. Louis, MO (US)

(72) Inventors: Donna M. Santoro, St. Charles, MO (US); Andy Lee Kirkpatrick, Green Bay, WI (US); Kacey James Kreuter, Green Bay, WI (US); Stephen John Kocis, Suwanee, GA (US); Lesley S. Corker, Atlanta, GA (US); Stephen Joel Zwonitzer, Hoschton, GA (US); Russell Kroll, Atlanta, GA (US); Randal Porter, Norcross, GA (US)

(73) Assignee: Vi-Jon, Inc., St. Louis, MO (US)

( * ) Notice: Subject to any disclaimer, the term of this patent is extended or adjusted under 35 U.S.C. 154(b) by 0 days.

(21) Appl. No.: 15/686,685

(22) Filed: Aug. 25, 2017

(65) Prior Publication Data

US 2017/0347843 A1 Dec. 7, 2017

Related U.S. Application Data

(62) Division of application No. 15/088,984, filed on Apr. 1, 2016.

(60) Provisional application No. 62/144,194, filed on Apr. 7, 2015.

(51) Int. Cl.

| | |
|---|---|
| ***G01F 11/28*** | (2006.01) |
| ***A47K 5/12*** | (2006.01) |
| ***B05B 15/06*** | (2006.01) |
| ***B05B 11/00*** | (2006.01) |

(52) U.S. Cl.

CPC ........ *A47K 5/1211* (2013.01); *B05B 11/0054* (2013.01); *B05B 11/0059* (2013.01); *B05B 11/0097* (2013.01); *B05B 11/3014* (2013.01); *B05B 15/061* (2013.01)

(58) Field of Classification Search

CPC .......... A47K 5/1211; A47K 5/12; A47K 5/14; B05B 11/0054; B05B 11/0059; B05B 11/3014; B05B 11/0097; B05B 11/3002; B05B 11/3047; B05B 11/3057; B05B 11/3073; B05B 15/061; B65D 23/003

See application file for complete search history.

(56) References Cited

U.S. PATENT DOCUMENTS

| | | |
|---|---|---|
| 4,122,979 A | 10/1978 | Laauwe |
| 5,897,031 A | 4/1999 | Wirt et al. |
| 6,516,976 B2 | 2/2003 | Lewis et al. |

(Continued)

FOREIGN PATENT DOCUMENTS

| | | |
|---|---|---|
| EP | 2294958 A2 | 3/2011 |
| WO | 9835599 A1 | 8/1998 |

(Continued)

*Primary Examiner* — Nicholas J Weiss
*Assistant Examiner* — Randall Gruby
(74) *Attorney, Agent, or Firm* — Armstrong Teasdale LLP

(57) ABSTRACT

A dispenser assembly for dispensing a liquid product includes a bottle configured to store the product, a venting pump connected to the bottle and configured to control dispensing of the product from the bottle, a mounting component, and an enclosure connected to the mounting component and engaging the bottle, wherein the enclosure is movable relative to the mounting component between an open configuration and a closed configuration, and wherein the bottle is selectively removable from the enclosure when the enclosure is in the open configuration.

6 Claims, 19 Drawing Sheets

(56) References Cited

U.S. PATENT DOCUMENTS

| | | | | |
|---|---|---|---|---|
| 6,533,145 | B2 | 3/2003 | Lewis et al. | |
| 6,540,017 | B2 | 4/2003 | Sugawara et al. | |
| 6,543,651 | B2 | 4/2003 | Lewis et al. | |
| 6,575,334 | B2 | 6/2003 | Lewis et al. | |
| 6,575,335 | B2 | 6/2003 | Lewis et al. | |
| 6,648,179 | B2 | 11/2003 | Lewis et al. | |
| 6,729,502 | B2 | 5/2004 | Lewis et al. | |
| 6,832,701 | B2 | 12/2004 | Schiller | |
| 7,044,328 | B1 | 5/2006 | Ciavarella | |
| 7,201,295 | B1 * | 4/2007 | Sitzberger | A47K 5/1207 137/853 |
| 7,278,554 | B2 * | 10/2007 | Armstrong | A47K 5/1202 222/181.1 |
| 7,780,039 | B2 | 8/2010 | Criswell et al. | |
| 7,874,463 | B2 | 1/2011 | Ciavarella | |
| 7,992,804 | B2 * | 8/2011 | Nauels | A47K 5/1208 239/349 |
| 8,002,150 | B2 * | 8/2011 | Ophardt | G01F 11/025 222/181.3 |
| 8,071,933 | B2 | 12/2011 | Ophardt et al. | |
| 8,091,739 | B2 * | 1/2012 | Ophardt | G01F 11/025 222/181.3 |
| 8,113,388 | B2 * | 2/2012 | Ophardt | G01F 11/025 222/181.3 |
| 8,251,253 | B1 * | 8/2012 | Cleghorn | H01H 9/02 174/50 |
| 8,272,539 | B2 * | 9/2012 | Ophardt | A47K 5/1207 222/181.1 |
| 8,348,101 | B2 | 1/2013 | Ciavarella et al. | |
| 8,387,834 | B2 | 3/2013 | Proper et al. | |
| 8,505,776 | B2 | 8/2013 | Criswell et al. | |
| 8,863,989 | B2 | 10/2014 | Criswell et al. | |
| 2004/0173635 | A1 * | 9/2004 | Bunoz | A47K 5/1202 222/183 |
| 2004/0232168 | A1 * | 11/2004 | Ciavarella | A47K 5/1202 222/156 |
| 2005/0006408 | A1 * | 1/2005 | Ganzeboom | A47K 5/14 222/190 |
| 2006/0032871 | A1 * | 2/2006 | Ophardt | A47K 5/1202 222/518 |
| 2006/0131329 | A1 * | 6/2006 | Sayers | A47K 5/1217 222/105 |
| 2006/0213929 | A1 * | 9/2006 | Ophardt | A47K 5/12 222/180 |
| 2006/0278655 | A1 * | 12/2006 | Ophardt | A47K 5/1207 222/80 |
| 2007/0251953 | A1 * | 11/2007 | Criswell | A47K 5/1207 222/105 |
| 2007/0272708 | A1 * | 11/2007 | Muhlen | A47K 5/1208 222/181.3 |
| 2008/0083786 | A1 * | 4/2008 | Marin | A47K 5/122 222/181.3 |
| 2008/0135578 | A1 * | 6/2008 | Ophardt | A47K 5/1202 222/136 |
| 2009/0101671 | A1 * | 4/2009 | Cittadino | A47K 5/1202 222/23 |
| 2009/0212073 | A1 | 8/2009 | Haworth | |
| 2009/0266842 | A1 * | 10/2009 | Snodgrass | A47K 5/1202 222/52 |
| 2009/0302061 | A1 * | 12/2009 | Ophardt | B67D 1/0004 222/181.3 |
| 2010/0059550 | A1 * | 3/2010 | Ciavarella | A47K 5/1207 222/325 |
| 2010/0147890 | A1 * | 6/2010 | Ciavarella | A47K 5/1202 222/181.2 |
| 2011/0056987 | A1 * | 3/2011 | Proper | A47K 5/12 222/153.13 |
| 2011/0101032 | A1 * | 5/2011 | Hsu | A47K 5/1202 222/309 |
| 2011/0132933 | A1 | 6/2011 | Ophardt et al. | |
| 2012/0080452 | A1 | 4/2012 | Boshuizen et al. | |
| 2013/0292410 | A1 | 11/2013 | Pelkey et al. | |
| 2014/0091106 | A1 | 4/2014 | Ophardt et al. | |
| 2014/0166677 | A1 | 6/2014 | Flanagan-Kent et al. | |
| 2014/0231460 | A1 | 8/2014 | Pelkey et al. | |

FOREIGN PATENT DOCUMENTS

| | | | |
|---|---|---|---|
| WO | 0168455 | A1 | 9/2001 |
| WO | 2010114743 | A1 | 10/2010 |

* cited by examiner

DISPENSER ASSEMBLY

CROSS-REFERENCE TO RELATED APPLICATION

This application is a divisional of U.S. patent application Ser. No. 15/088,984 filed on Apr. 1, 2016, which claims priority to U.S. Provisional Patent Application No. 62/144,194 filed on Apr. 7, 2015, the entire disclosures of which are hereby incorporated by reference in their entirety.

FIELD

This disclosure generally relates to dispensing a product, and more specifically, to a dispenser assembly for dispensing a viscous cleaning, sanitizing, or other skin care product.

BACKGROUND

To help with hand hygiene and skin care, dispensing systems distribute cleaning, sanitizing, and skin care products to a user. In various institutional establishments such as hospitals, schools, restaurants, offices, and restrooms, it is highly desirable to provide dispensing equipment in order to lessen the risk of contamination and control the spread of harmful germs. These dispensing systems may be maintained, for example, in a vertical surface-mounted setting with a refill cartridge of hand sanitizer, liquid soaps, and/or other viscous skin care products. The designs of various dispensers have a range of complexity which impact ease of use and cost.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF SUMMARY

One aspect is a dispenser assembly for dispensing a liquid product. The dispenser assembly includes a bottle configured to store the product, a venting pump connected to the bottle and configured to control dispensing of the product from the bottle, a mounting component, and an enclosure connected to the mounting component and engaging the bottle, wherein the enclosure is movable relative to the mounting component between an open configuration and a closed configuration, and wherein the bottle is selectively removable from the enclosure when the enclosure is in the open configuration.

Another aspect is a method of assembling a dispenser assembly for dispensing a liquid product. The method includes connecting a venting pump to a bottle configured to store the product, the venting pump configured to control dispensing of the product from the bottle, connecting an enclosure to a mounting component in an open configuration, inserting the bottle into the enclosure while the enclosure is in the open configuration, and moving the enclosure relative to the mounting component to transition the enclosure into a closed configured that secures the bottle within the enclosure.

Yet another aspect is a method of manufacturing a bottle for dispensing a liquid product. The method includes forming a body portion of the bottle, wherein the body portion defines a liquid chamber for holding a quantity of the liquid product, forming a neck portion of the bottle, wherein the neck portion is coupled to the body portion, and forming a bulge on the body portion of the bottle, wherein the bulge is sized and oriented to be positioned within an aperture of an enclosure that engages the bottle, and wherein the aperture is defined by a pair of ribs of the enclosure and a handle portion extending between the pair of ribs.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION

The disclosure provides a minimal dispenser assembly that requires less plastic casing and that features an easily replaceable, invertible bottle. The bottle may be used in an upright or inverted orientation. The minimal design reduces maintenance and is thereby relatively cost efficient as compared to at least some known designs.

Figure 1:
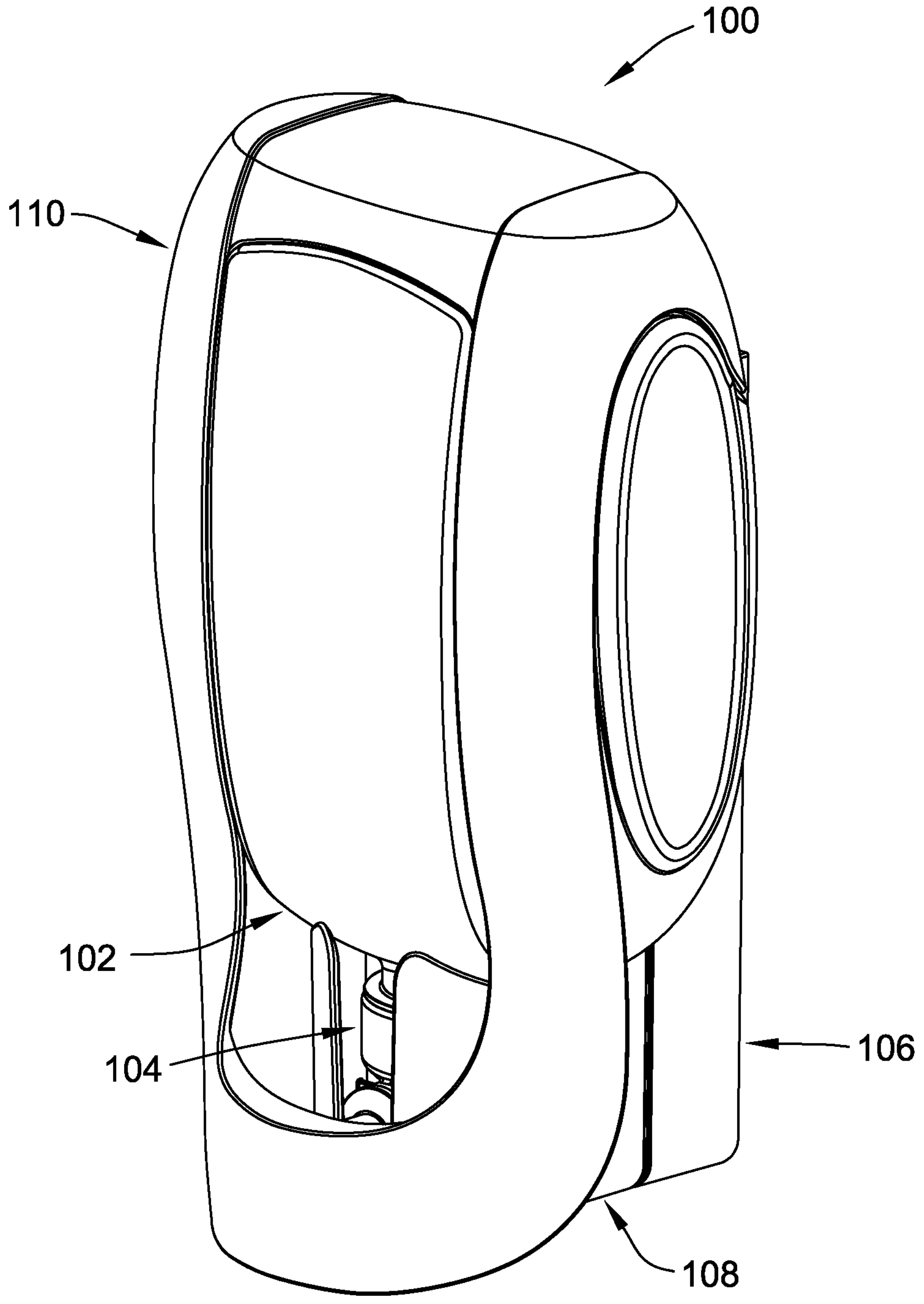
FIG. 1 is a perspective view of a dispenser assembly.

Referring now to the drawings and in particular to FIG. 1, a dispenser assembly, generally indicated at 100, includes a bottle 102, a venting pump 104, a mounting component 106, a bracing component 108, and an enclosure 110. The dispenser assembly 100 is generally configured to dispense a product (not shown) therefrom, in particular a liquid, such as hand sanitizer, soaps, or other liquid skin care products. As will be described in more detail below, the bottle 102 contains a product (e.g., a liquid product) therein. As described in detail herein, when a user presses a handle portion of the enclosure 110 with his or her hand, the handle portion of the enclosure 110 engages with a nozzle portion of the venting pump 104. The nozzle portion is depressed inwardly with respect to the dispensing assembly, and the product contained within the bottle 102 is dispensed from an opening included in the venting pump 104.

Figure 2:
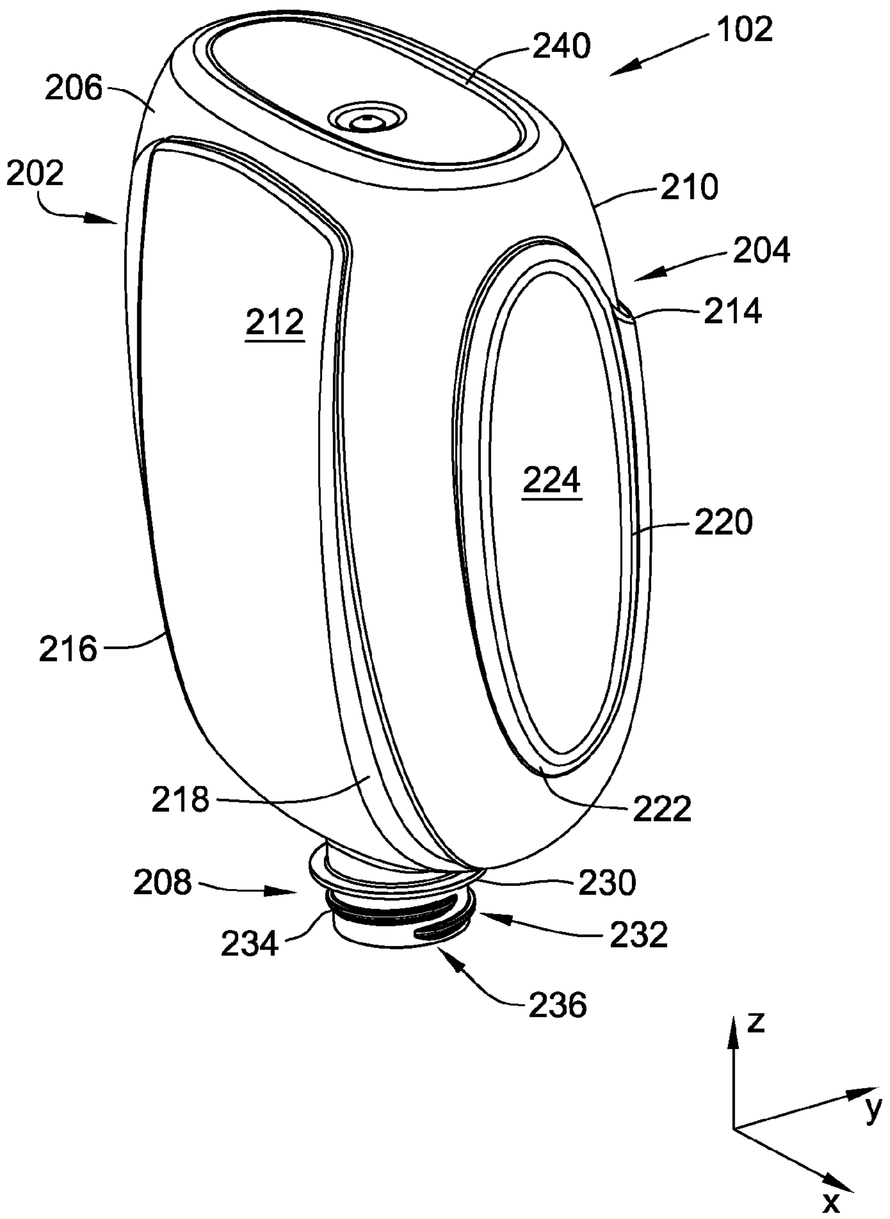
FIG. 2 is a perspective view of a bottle that may be used with the dispenser assembly shown in FIG. 1.
Figure 3:
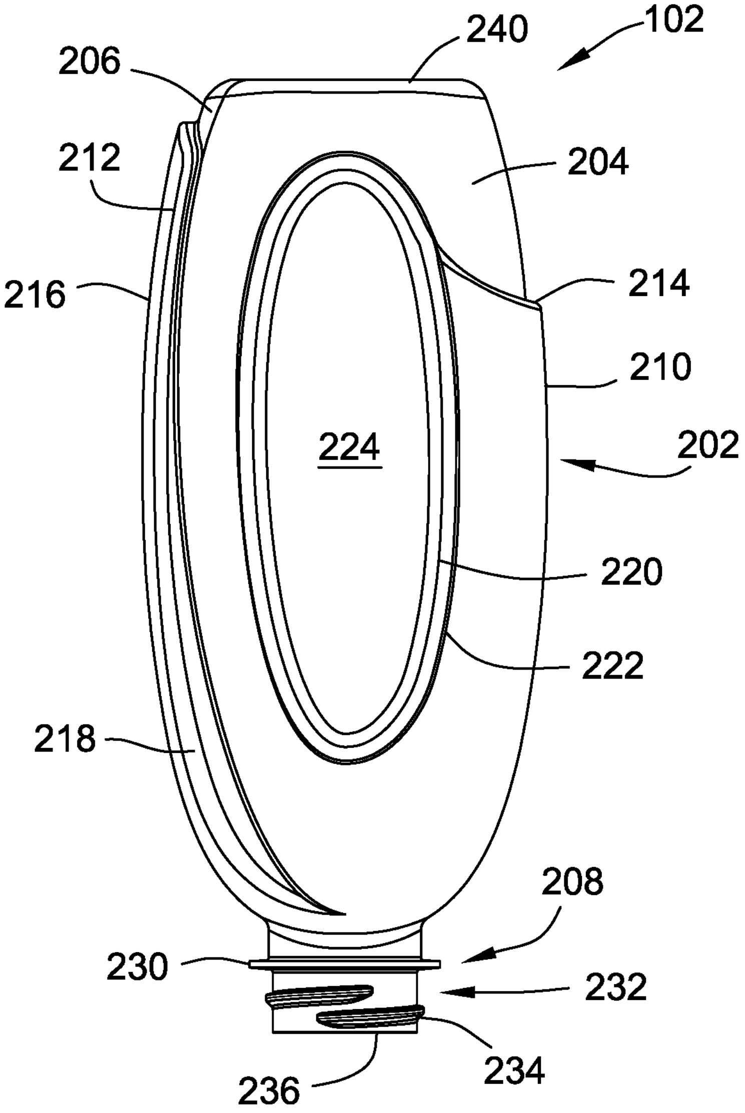
FIG. 3 is a side view of the bottle shown in FIG. 2.

FIGS. 2 and 3 are various views of the bottle 102 of the dispenser assembly 100 shown in FIG. 1. More particularly, FIG. 2 is a perspective view of the bottle 102, and FIG. 3 is a side view of the bottle 102. The bottle 102 generally includes a body portion 202, including opposing sides 204, a front 206, and a neck portion 208. The body portion 202 further includes a liquid chamber 210 defined therein and adapted to hold a quantity of product. The body portion 202 further includes a bulge 212 defined thereon as well as a ridge 214 disposed on opposing sides 204 of the body portion 202 of the bottle 102, such that the enclosure 110 (shown in FIG. 1) may engage the body portion 202 of the bottle 102, as described later herein. The bulge 212 includes a front face 216 defined generally at the front 206 of the bottle 102, oriented generally parallel with an x-z plane as defined in FIG. 2. The bulge 212 also includes a side face 218 that extends at least partially around the bulge 212. The side face 218 is oriented generally perpendicular to the front face 216 (i.e., parallel with a y-z plane). The side face 218 defines a depth that allows flexible movement of the enclosure 110 about the bottle 102, as will be described in more detail herein.

The body portion 202 of the bottle 102 also includes an outwardly projecting rim 220 on opposing sides 204 of the bottle 102. The outwardly projecting rim 220 includes a generally elliptical edge 222, defining a concave recess 224 therein. The concave recess 224 is configured to enable easier handling of the bottle 102 by a user (e.g., a user installing the bottle 102 into the dispenser assembly 100 during initial installation or refill) by generally defining a grip thereon.

The neck portion 208 of the bottle 102 includes a flange 230 extending substantially radially outwardly (i.e., parallel with an x-y plane) of the bottle 102 as shown. The neck portion 208 further includes an externally threaded portion 232 having threads 234 disposed thereon. As will be described in further detail herein, the neck portion 208 is configured to engage with a collar portion of the venting pump 104 (shown in FIG. 1) to close the bottle 102 and contain the product therein without leakage of the product. The neck portion 208 generally defines an opening 236 to the bottle 102 from which product may be dispensed.

In this embodiment, the bottle 102 also includes a top 240 that is, as best seen in FIG. 3, substantially flat. By including the flat top 240, the bottle 102 is configured to be converted or easily inverted, e.g., from an upside-down position (i.e., with the opening 236 facing downwards) to a right-side-up position (i.e., with the opening 236 facing upwards), such that the bottle 102 may also be used as a stand-alone bottle 102 for containing a liquid product. Accordingly, the complete dispenser assembly 100 may be installed on, for example, a wall, and a stand-alone bottle 102 may be placed on, for example, a sink vanity, with the design aesthetic of the two dispensers (i.e., the dispenser assembly 100 and the bottle 102) unified. The bottle 102 may also include indicia disposed thereon (not shown) for branding purposes, description of the product contained therein, or any other purpose.

It should be understood that the bottle 102 may have different configurations, shapes, and sizes than those illustrated and described herein without departing from the present disclosure. The bottle 102 may be made of any suitable material such as, without limitation, polyethylene terephthalate (PET) or any other plastic or thermoplastic resin. The bottle 102 can be made in any desired color or colors, and may be transparent, translucent, or opaque.

Figure 4:
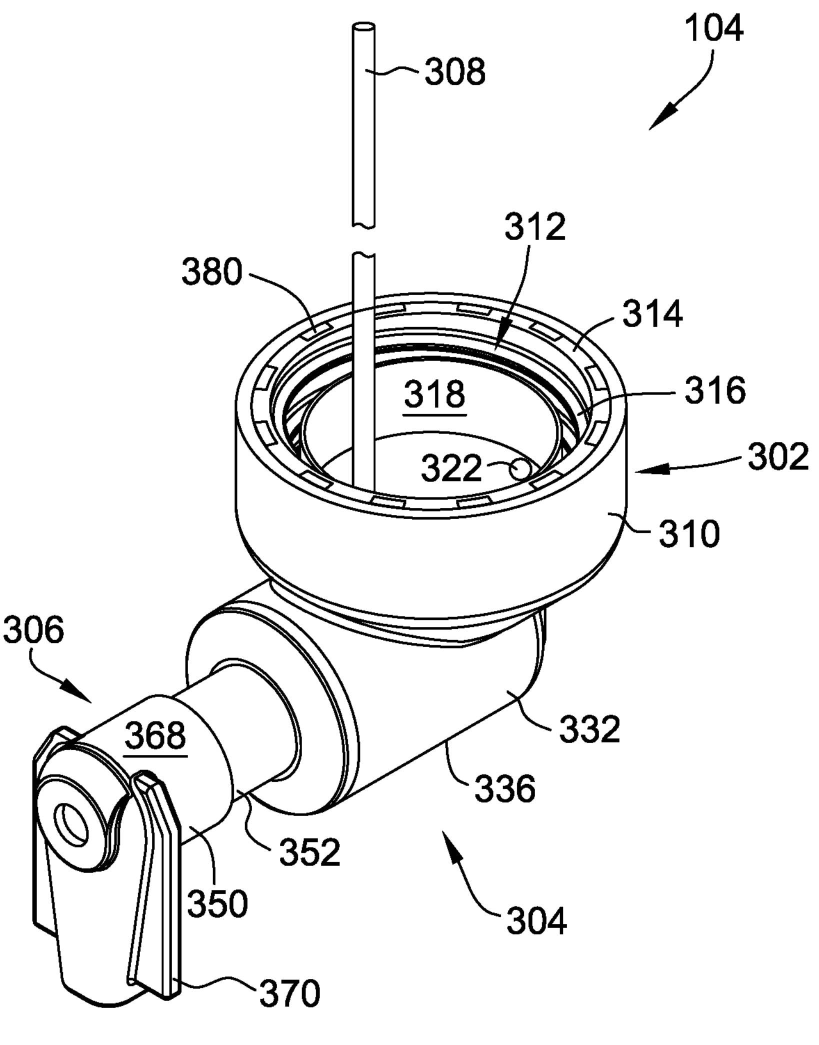
FIG. 4 is a perspective view of a venting pump that may be used with the dispenser assembly shown in FIG. 1.
Figure 5:
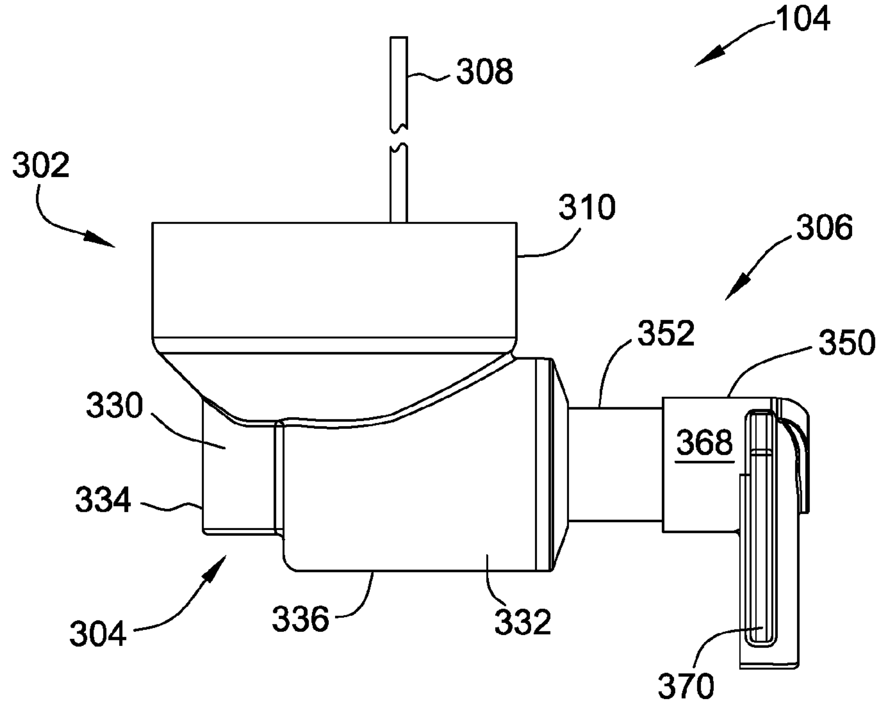
FIG. 5 is a side view of the venting pump shown in FIG. 4.
Figure 6:
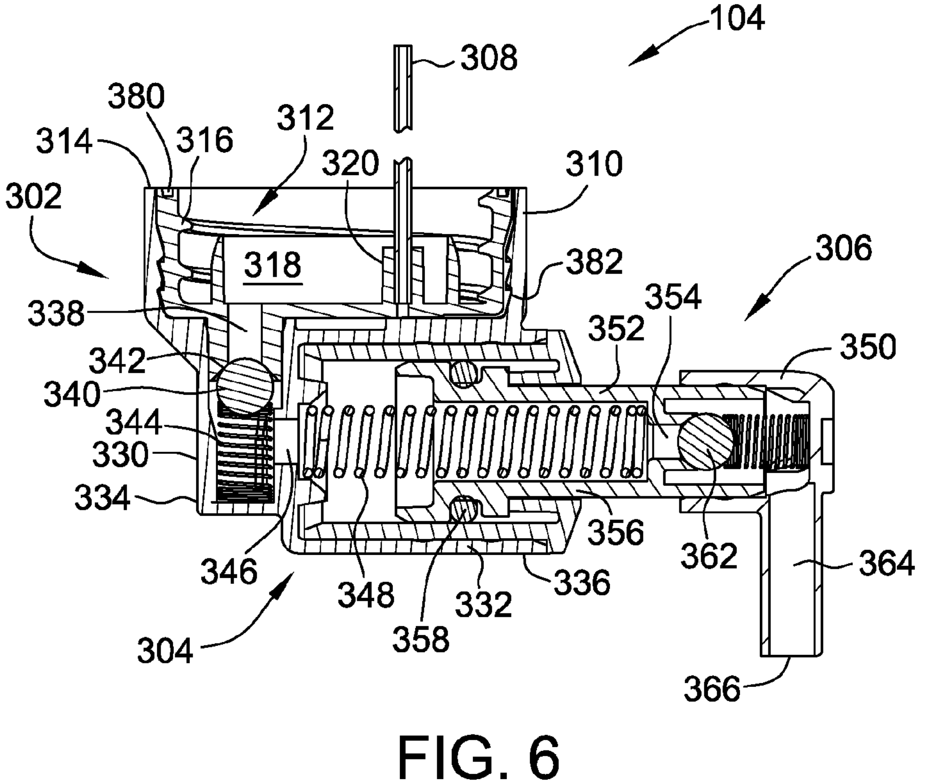
FIG. 6 is a cross-sectional view of the venting pump shown in FIG. 4.

FIGS. 4-6 are various views of the venting pump 104 of the dispenser assembly 100 shown in FIG. 1. In particular, FIG. 4 is a perspective view of the venting pump 104, FIG. 5 is a side view of the venting pump 104, and FIG. 6 is a cross-sectional view of the venting pump 104. The venting pump 104 includes a collar portion 302, a chamber portion 304, a nozzle portion 306, and a vent tube 308.

The collar portion 302 of the venting pump 104, as best shown in FIG. 4, includes a collar 310 and an internally threaded portion 312 concentric with and disposed radially inwardly from the collar 310. The collar 310 and the internally threaded portion 312 together define an annular rim 314. The internally threaded portion 312 includes threads 316 disposed thereon for threaded engagement with the threads 234 of the neck portion 208 of the bottle 102 (shown in FIGS. 2 and 3). The threads 234, 316 are suitably disposed such that the venting pump 104 will close the bottle 102 to prevent leakage of the product therefrom. Moreover, the annular rim 314 of the venting pump 104 is configured to engage in a face-to-face relationship with the transversely extending flange 230 of the bottle 102 to provide a seal that facilitates preventing leakage of the product. The annular rim 314 also includes vent holes 380 defined therein, as will be described in further detail below.

The collar portion 302 further includes a partition 318 generally concentric with the collar 310. The partition 318 is configured to engage with an inner wall of the neck portion 208 of the bottle 102 (not shown) to further prevent leakage of the product. The collar portion 302 also includes a socket 320 for receiving the vent tube 308 and an inlet hole 322 for allowing the flow of product into the venting pump 104.

The chamber portion 304 of the venting pump 104 includes a first chamber 330 and a second chamber 332 adjacent to and in flow communication with the first chamber 330. Each of the first chamber 330 and the second chamber 332 is generally cylindrical. The first chamber 330 includes an outer surface 334, and the second chamber 332 includes an outer surface 336. The first chamber 330 also includes an inlet 338, an inlet valve 340, a generally conical seat 342 for the inlet valve 340, and a first spring 344. The second chamber 332 includes an inlet 346 and a second spring 348.

The nozzle portion 306 of the venting pump 104 includes a head 350 and a neck 352 that puts the head 350 in flow communication with the second chamber 332 through a channel 354 included within the neck 352 and the head 350. The neck 352 generally defines a piston 356 and includes a sealing ring 358 disposed thereabout inside of the second chamber 336. The head 350 further includes a third spring 360 and an outlet valve 362, as well as an outlet 364 and an opening 366 defined therein. The head 350 further includes a cylindrical portion 368 and flanges 370 disposed on opposing side edges thereof. The flanges 370 are configured to engage with a bracket included on the enclosure 110 (shown in FIG. 1), as will be described later herein.

To activate the venting pump 104, a pushing force is applied on the nozzle portion 306. The pushing force causes the nozzle portion 306 (including the head 350 and the neck 352) to move inwards. More specifically, the piston 356 of the neck 352 is moved into the second chamber 332, reducing the volume of the second chamber 332. The reduction in volume causes an increase in the internal pressure of the venting pump 104, which causes the inlet valve 340 in the first chamber 330 to engage with the conical seat 342 and cut off flow communication of the inlet 338 to the first chamber 330. In addition, the increased pressure forces product out of the first and second chambers 330 and 332 through the channel 354. The product is forced against the outlet valve 362, compressing the third spring 360 in the head 350, which allows the product to flow out the neck 352 into the head 350, through the outlet 364, and out the opening 366 (into, for example, a user's hand).

When the force is removed (e.g., the user removes his or her hand), the second spring 348 in the second chamber 332 forces the piston 356 back into a "ready" (i.e., extended outward) position. Thereby, the volume of the second chamber 332 is increased, and the pressure therein is reduced. The third spring 360 in the head 350 forces the outlet valve 362 to seal the outlet 364, and the inlet valve 340 in the first chamber 332 un-seats from the conical seat 342 due to the downward force exerted by the weight of the product through the inlet 346 of the first chamber 330. Accordingly, product is allowed to flow from liquid chamber 210 of the bottle 102 through the inlet hole 322, through the inlet 338 into the first chamber 330, and through the inlet 346 into the second chamber 332. The venting pump 104 is then ready for subsequent use. The sealing ring 358 prevents the product from leaking out of the second chamber 330 around the neck 352.

The vent holes 380 in the collar portion 302 of the venting pump 104 are in flow communication with a gap 382 defined between an inner wall of the collar 310 and the internally threaded portion 312. The gap 382 is in flow communication with the socket 320 and, thereby, is in flow communication with the vent tube 308. The vent holes 380, the gap 382, the socket 320, and the vent tube 308 define a vent path such that ambient air may flow into the bottle 102 when the dispenser assembly 100 is used. In the example embodiment, though not explicitly shown, the vent tube 308 is of sufficient length that it extends substantially completely through the bottle 102. When the bottle 102 is "upside-down" (i.e., the opening 236 is facing downward) for installation into the dispenser assembly 100, there exists a small volume of air in the liquid chamber 210 (i.e., a volume not including the product contained within the liquid chamber 210). When the venting pump 104 is coupled to the bottle 102, the vent tube 308 is sufficiently long such that the vent tube 308 extends into this volume of air. The vent path is always open, which prevents the formation of a vacuum in the bottle 102, which would negatively affect the performance of the dispenser assembly 100 and would deform the bottle 102 during use.

In other embodiments, the chamber portion 304 may include more or fewer chambers. The chambers of the chamber portion 304 may be of any configuration. For example, the chamber portion 304 may include air and liquid chambers, such that a product dispensed from the dispenser assembly 100 will be in a viscous liquid state. It should be understood that the venting pump 104 may have different configurations, shapes, and sizes than those illustrated and described herein without departing from the present disclosure. The venting pump 104 may be made of any suitable material such as, without limitation, any plastic or thermoplastic resin. Moreover, discrete elements of the venting pump 104 (e.g., the nozzle portion) may be made of a different material than other elements (e.g., the chamber portion and/or collar portion). The venting pump 104 can be made in any desired color or colors, and may be transparent, translucent, or opaque.

Figure 7:
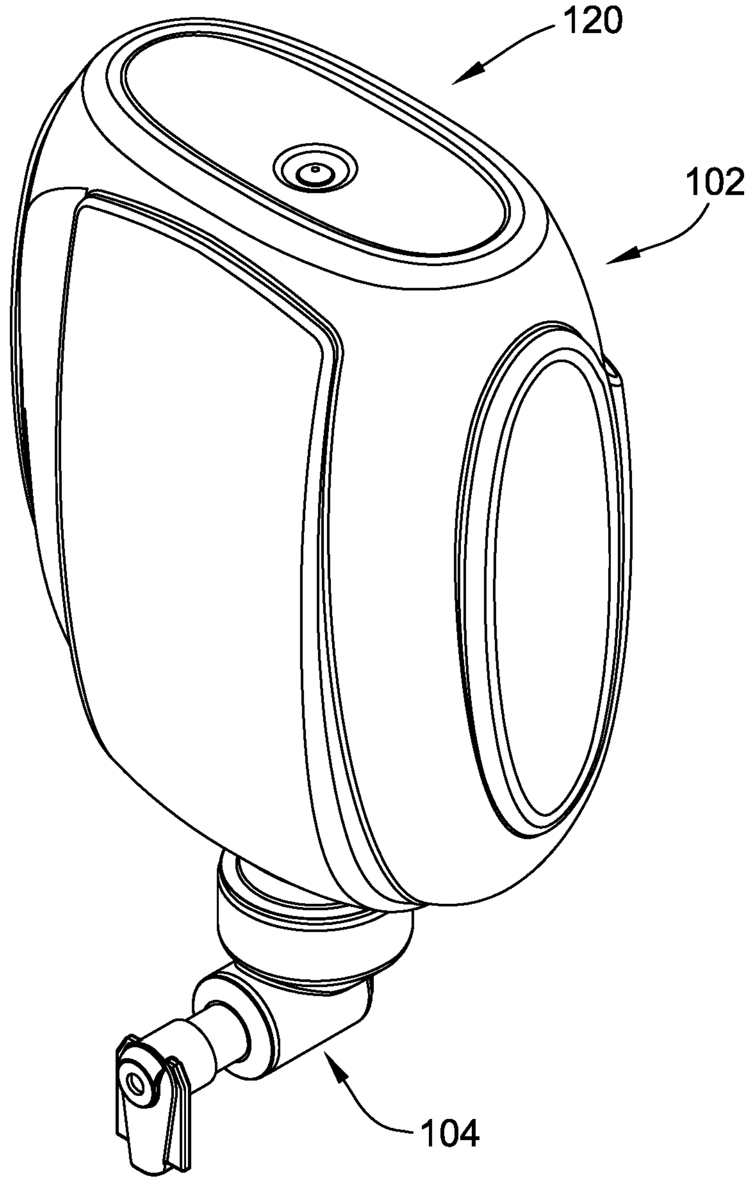
FIG. 7 is a perspective view of the dispenser assembly shown in FIG. 1 in an intermediate stage of assembly.

FIG. 7 is a perspective view of the dispenser assembly 100 shown in FIG. 1 in an intermediate stage of assembly. A partial assembly 120 includes the venting pump 104 coupled to the bottle 102 of the dispenser assembly 100. In the example embodiment, the nozzle portion 306 of the venting pump 104 (shown in FIGS. 4-6) is oriented to project in substantially the same direction as the front 206 of the bottle 102 (shown in FIGS. 2 and 3) to facilitate use of the dispenser assembly 100 as will be described in more detail below.

Figure 8:
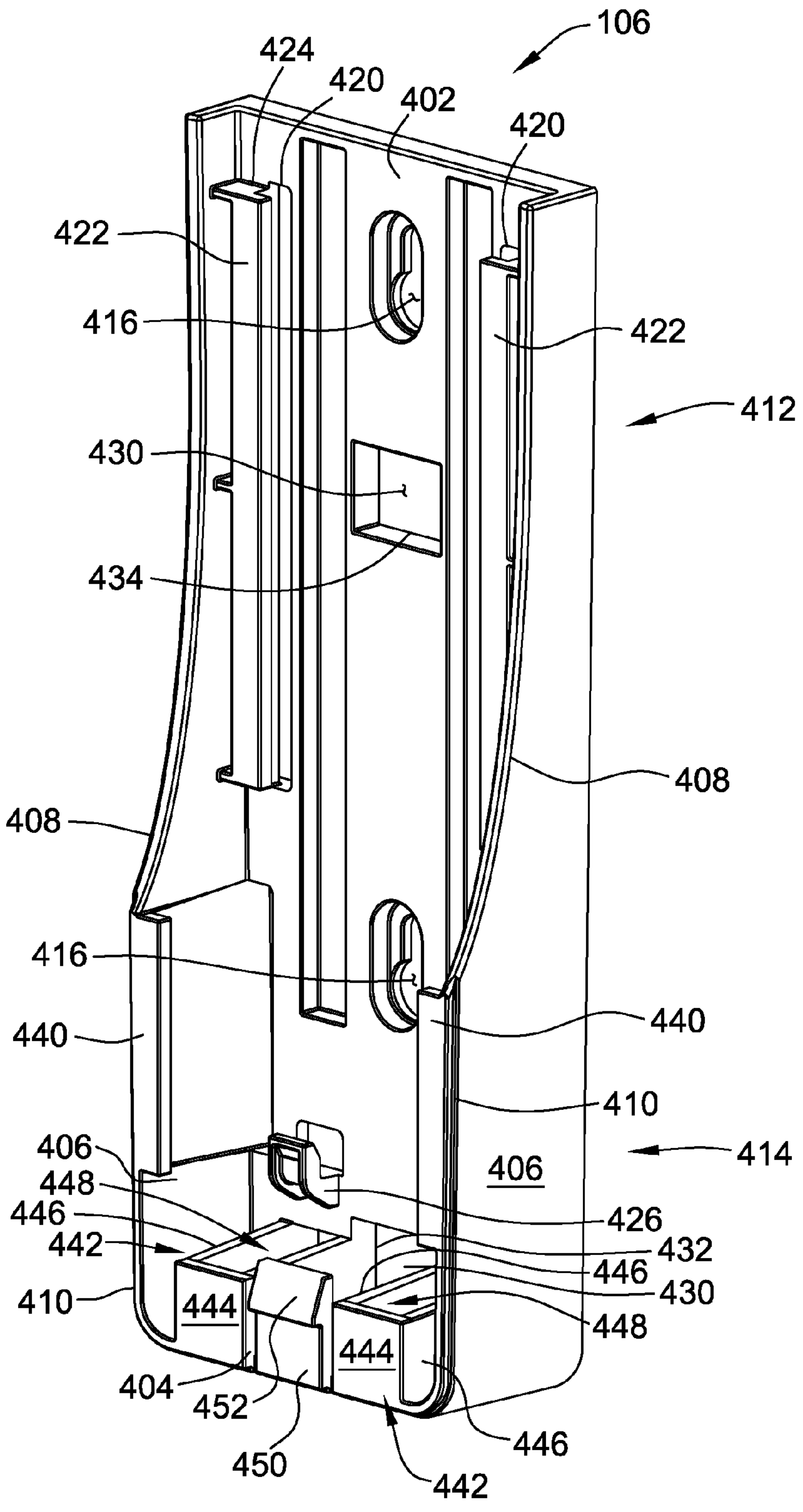
FIG. 8 is a perspective view of a mounting component that may be used with the dispenser assembly shown in FIG. 1.
Figure 9:
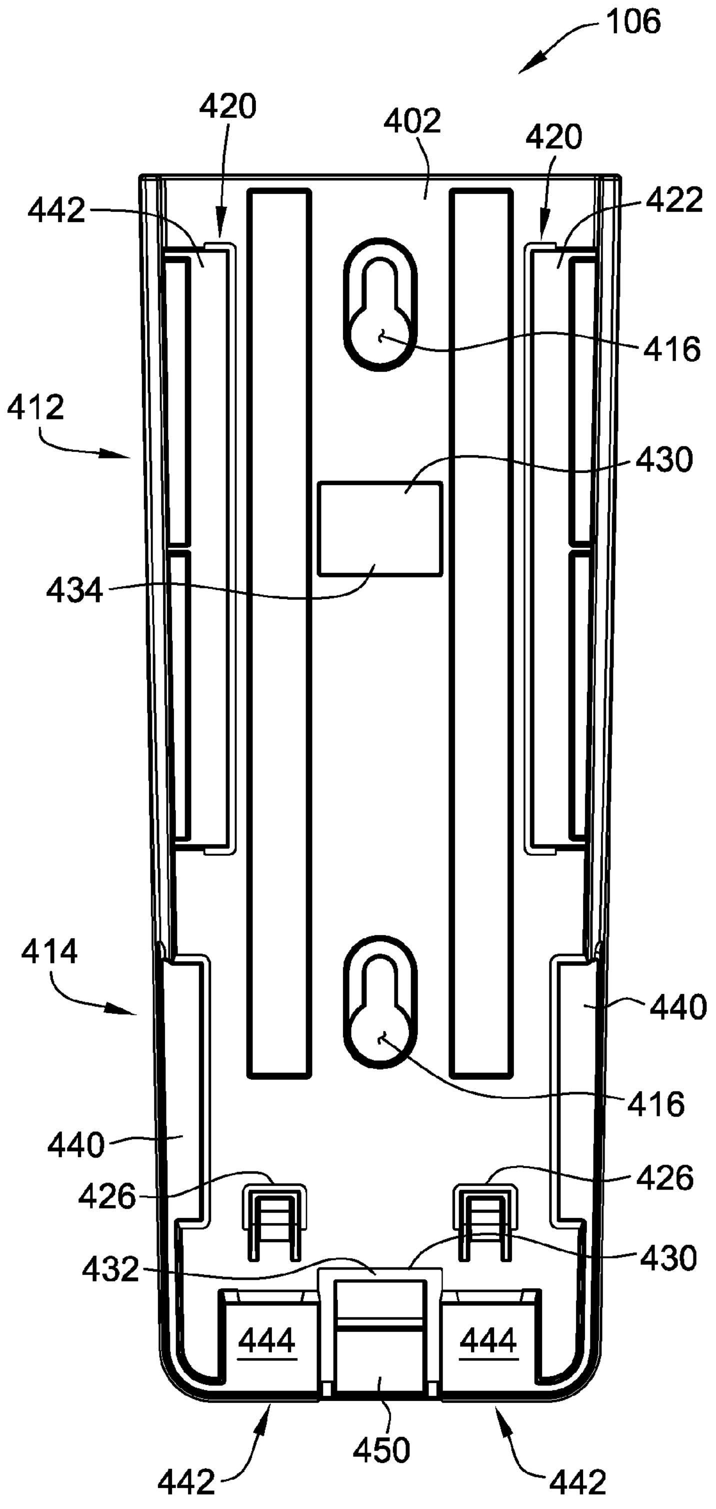
FIG. 9 is a front view of the mounting component shown in FIG. 8.
Figure 10:
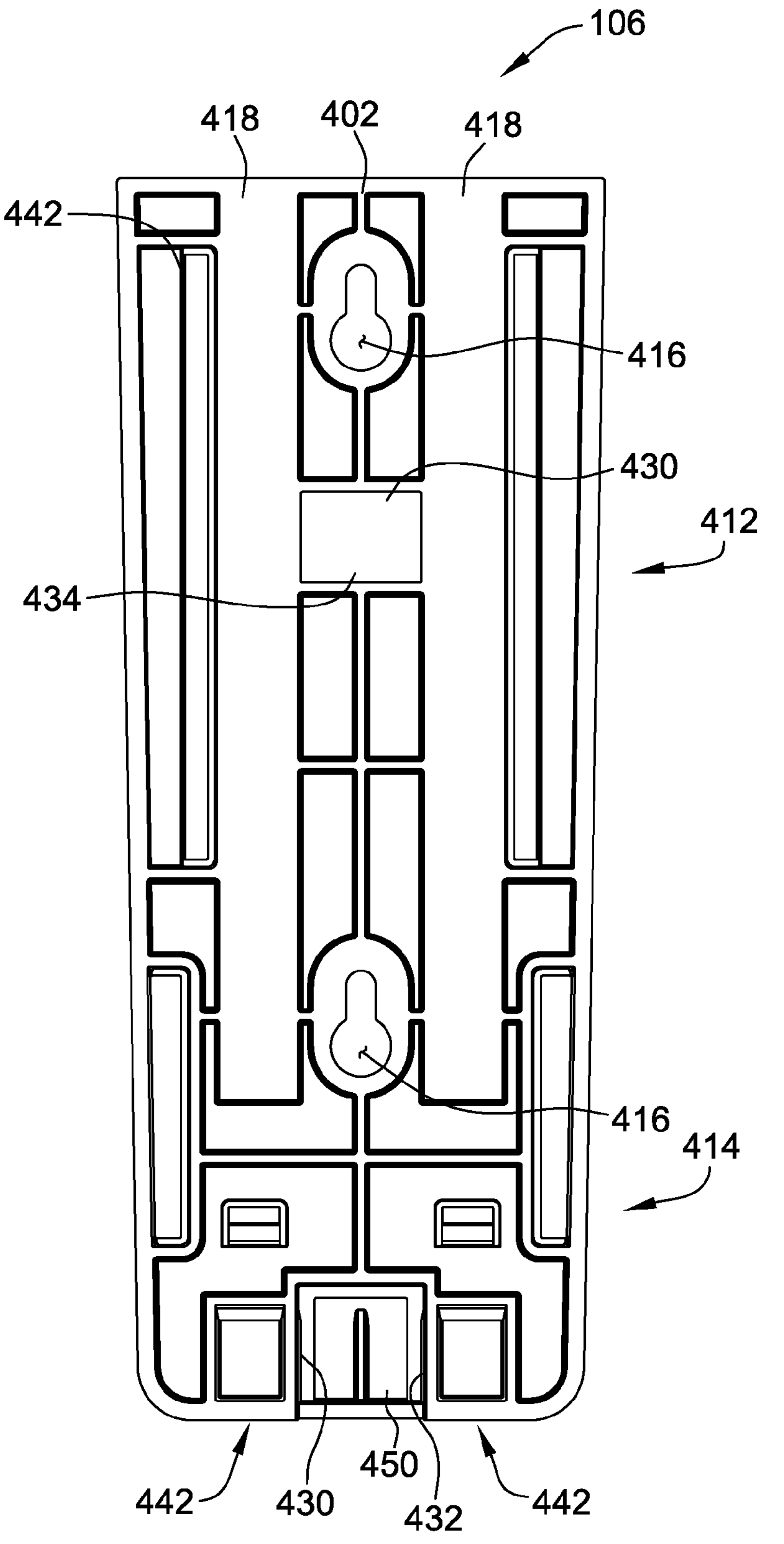
FIG. 10 is a back view of the mounting component shown in FIG. 8.

FIGS. 8-10 are various views of the mounting component 106 of the dispenser assembly 100 shown in FIG. 1. In particular, FIG. 8 is a perspective view of the mounting component 106, FIG. 9 is a front view of the mounting component 106, and FIG. 10 is a back view of the mounting component 106.

The mounting component 106 includes a back wall 402, a bottom wall 404, and two opposing side walls 406 integrally formed with the back wall 402 and bottom wall 404. Each side wall 406 includes an arcuate edge 408 and a front edge 410. In the example embodiment, the arcuate edge 408 is configured to be complementary to a shape of the body portion 202 of the bottle 102 (shown in FIGS. 2 and 3). Accordingly, when the dispenser assembly 100 is assembled, at least a portion of the body portion 202 of the bottle 102 may engage the arcuate edge 408 of at least one side wall 406 of the mounting component 106, such that the bottle 102 is supported within the dispenser assembly 100.

The back wall 402 includes, generally, a top region 412 and a bottom region 414. The back wall 402 of the mounting component 106 includes at least one mounting hole 416 defined therein in at least one of the top region 412 and the bottom region 414. The mounting hole 416 is configured to receive a mounting element (not shown) such as, without limitation, a nail head, a screw head, or a hook, upon installation of the dispenser assembly 100, such that the mounting component 106 may be substantially fixed to a wall or other support structure (not shown). The back wall 402 further includes at least one mounting panel 418, which is configured to receive an adhesive element (not shown), such as, for example, a mounting tape, to further secure the mounting component 106 (and, thereby, the dispenser assembly 100) to the wall or other support structure.

The mounting component 106 further includes two tracks 420, each track 420 generally defined by a lip 422 and a side face 424. The side face 424 extends from the back wall 402 and the lip 422 extends generally perpendicularly from the side face 424. Each track 420 is configured to receive a corresponding extension, extending from a back wall of the enclosure 110 (shown in FIG. 1). Each extension is received in a corresponding track 420 to engage with at least one of the lip 422 and the side face 424, thereby releasably coupling the extension to the mounting component 106 in a "tongue and groove"-type connection, upon assembly of the dispenser assembly 100. During refill of the dispenser assembly 100, the enclosure 110 is able to remain slidably coupled to the mounting component 106, as will be described later herein. The back wall 402 also includes at least one bracket 426 extending therefrom. Each bracket is configured to receive a bottom edge of a corresponding extension when the enclosure 110 engages the mounting component 106.

The back wall 402 further includes one or more locking slots 430 defined therein. In the example embodiment, the back wall 402 includes a closed position locking slot 432 and an open position locking slot 434. The closed position locking slot 434 is positioned in the bottom region 414 of the back wall 402 and defines an opening in the back wall 402. The open position locking slot 434 is positioned in the top region 412 of the back wall 402 and defines another opening therein. Generally, each locking slot 430 is configured to receive a locking tab disposed on a back wall of the enclosure 110. When the locking tab of the enclosure 110 engages the closed position locking slot 432 in a "snap fit" configuration, the dispenser assembly 100 may be referred to as being in a closed configuration. The closed configuration enables use of the dispenser assembly 100 by a user (i.e., to dispense product therefrom). When the locking tab of the enclosure 110 engages the open position locking slot 434 in a "snap fit" configuration, the dispenser assembly 100 may be referred to as being in an open configuration. The open configuration enables maintenance and manipulation (e.g., refill) of various components of the dispenser assembly 100, and in particular, the bottle 102. The transition from the closed configuration to the open configuration will be described later herein.

In the example embodiment, the front edge 410 of each side wall 406 is oriented substantially parallel to the back wall 402 of the mounting component 106 (i.e., substantially vertically). In other embodiments, the front edge 410 may be oriented other than parallel to the back wall 402. Each front edge 410 includes a lip 440 extending therefrom. In the example embodiment, the lip 440 is oriented substantially perpendicular to the side walls 406. In other embodiments, each lip 440 may be oriented other than perpendicular to the side walls. As will be described further herein, each lip 440 is configured to engage a corresponding projection on a back wall of the bracing component 108 (shown in FIG. 1) of the dispenser assembly 100, such that the bracing component 108 may be coupled to the mounting component 106 in a "tongue and groove"-type connection.

In order to further facilitate the coupling of the bracing component 108 with the mounting component 106, two troughs 442 and a locking tab 450 each project upwardly from the bottom wall 404 of the mounting component 106 (i.e., inwardly, with respect to the dispenser assembly 100 as a whole). In the example embodiment, the locking tab 450 is disposed between the two troughs 442. In other embodiments, there may be more or fewer than two troughs 442 and/or more or fewer than one locking tab 450; and the locking tab(s) 450 and trough(s) 442 may be disposed in any arrangement suitable to facilitate the coupling of the bracing component 108 with the mounting component 106. Each trough 442 includes at least a front face 444 and two opposing side faces 446 defining a recess 448 therein. Each recess 448 is configured to receive a corresponding tab on the back wall of the bracing component 108, as will be described in further detail below. The locking tab 450 includes a protuberance 452 configured to engage in a "snap fit" with a ridge formed on the back wall of the bracing component 108.

It should be understood that the mounting component 106 may have different configurations, shapes, and sizes than those illustrated and described herein without departing from the present disclosure. The mounting component 106 may be made of any suitable material such as, without limitation, acrylonitrile-butadiene-styrene (ABS), or any other plastic, composite plastic, or thermoplastic resin. The mounting component 106 can be made in any desired color or colors, and may be transparent, translucent, or opaque.

Figure 11:
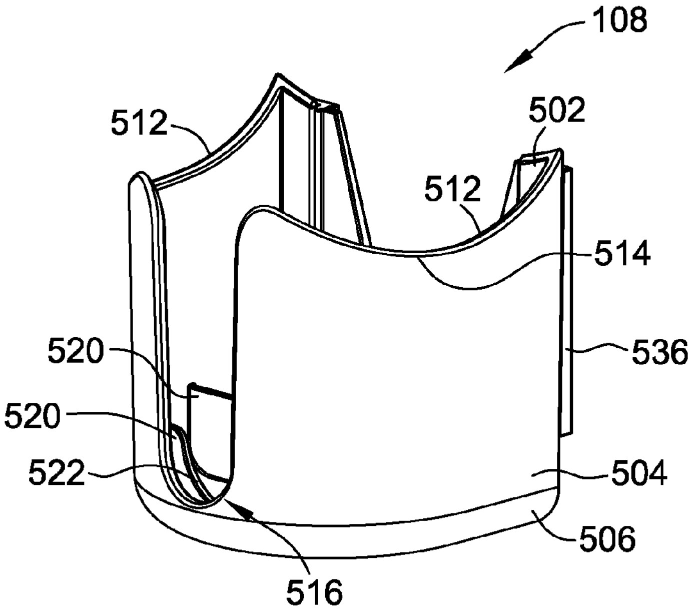
FIG. 11 is a first perspective view of a bracing component that may be used with the dispenser assembly shown in FIG. 1.
Figure 12:
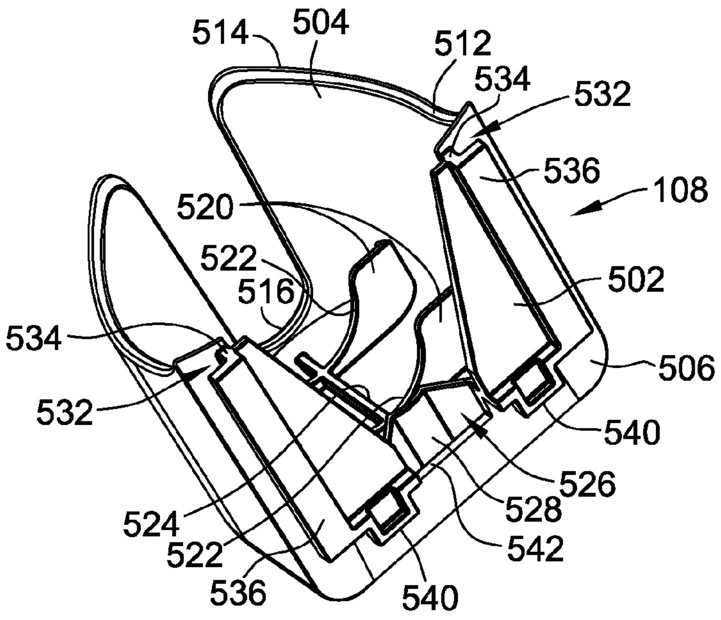
FIG. 12 is a second perspective view of the bracing component shown in FIG. 11.
Figure 13:
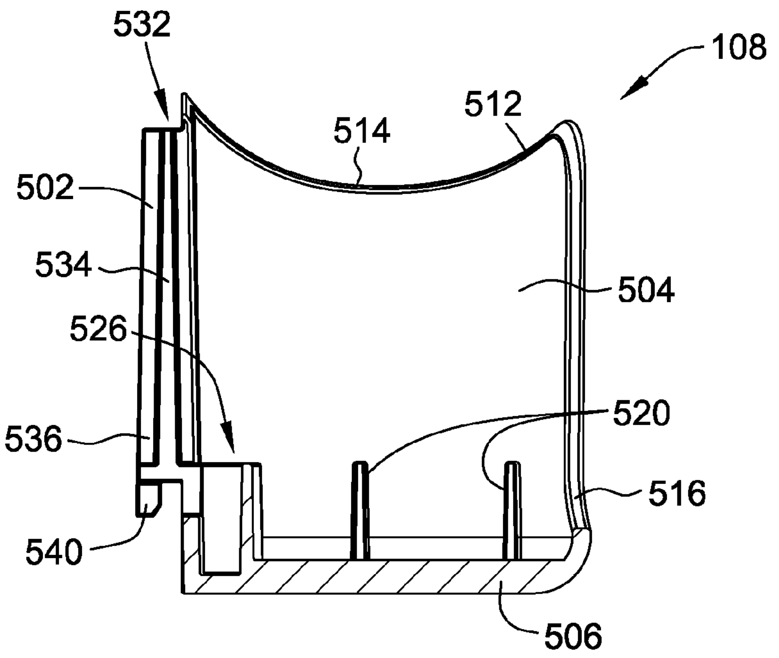
FIG. 13 is a cross-sectional view of the bracing component shown in FIG. 11.
Figure 14:
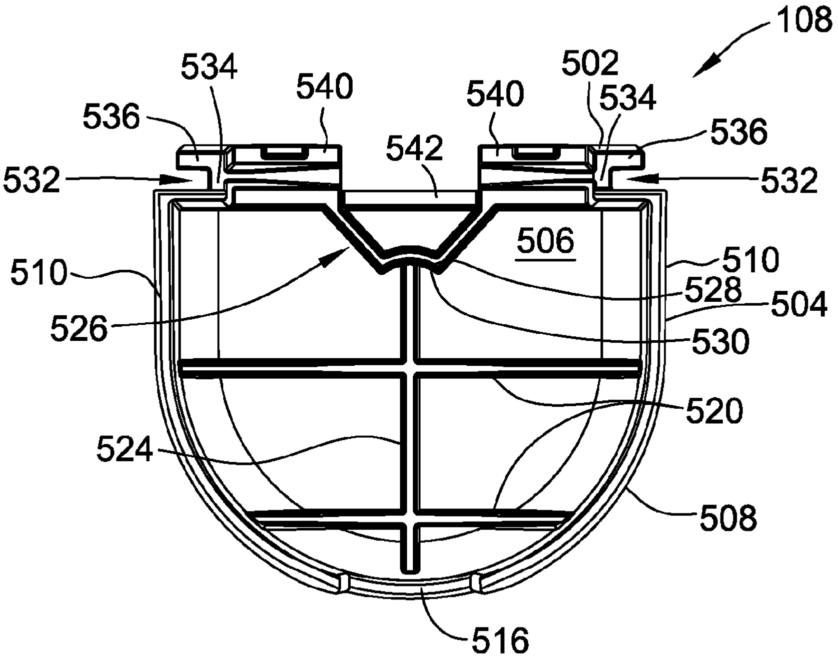
FIG. 14 is a top view of the bracing component shown in FIG. 11.

FIGS. 11-14 are various views of the bracing component 108 of the dispenser assembly 100 shown in FIG. 1. In particular, FIG. 11 is a first perspective view of the bracing component 108, FIG. 12 is a second perspective view of the bracing component 108, FIG. 13 is a side cross-sectional view of the bracing component 108, and FIG. 14 is a top view of the bracing component 108.

The bracing component 108 includes a back wall 502 integrally formed with a side wall 504 and a bottom wall 506. As best seen in FIG. 14, the side wall 504 includes a generally semi-circular region 508 and opposing, parallel planar regions 510. The side wall 504 further includes a top edge 512 continuously disposed along the planar regions 510 and the semi-circular region 508. In the example embodiment, the top edge 512 includes arcuate portions 514 arranged symmetrically therein. Each arcuate portion 514 is configured to be complementary to the shape of the body portion 202 of the bottle 102 (shown in FIGS. 2 and 3). Accordingly, when the dispenser assembly 100 is assembled, at least a portion of the body portion 202 of the bottle 102 may engage an arcuate portion 514 of the top edge 512 of the bracing component 108, such that the bottle 102 is supported and braced within the dispenser assembly 100.

At least one joist 520 projects upwardly from the bottom wall 506 of the bracing component 108. Each joist 520 is integrally formed with the bottom wall 506 in the example embodiment. In the example embodiment, the bottom wall 506 includes two joists 520, the two joists 520 joined together and further secured to the bottom wall 506 through a reinforcing spine 524. Each joist 520 includes an arcuate cutout 522 defined therein. In the example embodiment, the arcuate cutout 522 is configured to be complementary to a shape of the outer surface 336 of the second chamber 332 of the venting pump 104 (shown in FIGS. 4-6). Moreover, in the example embodiment, the back wall 502 includes a support portion 526 integrally formed therewith. The support portion 526 includes an arcuate wall 528 with an inner surface 530. The arcuate wall 528 is configured to be complementary to a shape of the outer surface 334 of the first chamber 330 of the venting pump 104 (also shown in FIGS. 4-6). Accordingly, when the dispenser assembly 100 is assembled, the second chamber 332 of the venting pump 104 may be supported by and engaged with the joists 520 of the bottom wall 506 of the bracing component 108, and the first chamber 330 may be coupled to the inner surface 530 of the arcuate wall 528 of the bracing component 108.

The side wall 504 of the bracing component 108 further includes a U-shaped cutout 516 defined therein. In the example embodiment, the U-shaped cutout 516 is configured to receive the cylindrical portion 368 of the head 350 of the venting pump 104 (also shown in FIGS. 4-6). Accordingly, when the dispenser assembly 100 is assembled, the cylindrical portion 368 of the head 350 is engaged with and coupled to the U-shaped cutout 516, such that the head 350 is laterally fixed in place.

The back wall 502 of the bracing component 108 defines channels 532. In the example embodiment, each channel 532 is generally defined by an intermediate wall 534 extending from and attached to the back wall 502 of the bracing component 108, and a projection 536 extending from the intermediate wall 534 and generally perpendicular thereto. In other embodiments, the projection 536 may be oriented other than perpendicular to the intermediate wall. As described above with respect to FIGS. 8-10 and the discussion of the mounting component 106, each channel 532 is configured to receive a lip 440 of the mounting component 106 (shown in FIGS. 8 and 9) therein to facilitate coupling the bracing component 108 to the mounting component 106 during assembly of the dispenser assembly 100.

The back wall 502 further includes at least one tab 540 extending therefrom. In the example embodiment, each tab 540 is integrally formed with and adjacent to a projection 536. During assembly of the dispenser assembly 100, each tab 540 is inserted into a corresponding recess 448 of a trough 442 in the mounting component 106 (shown in FIG. 8). Each tab 540 engages in a friction fit with a front face 444 (shown in FIG. 8) of a corresponding trough 442 to couple the bracing component 108 to the mounting component 106. The back wall 502 further includes a ridge 542 defined therein. The ridge 542 is configured to engage in a friction fit with the protuberance 452 of the locking tab 450 of the mounting component 106 (also shown in FIG. 8). In the example embodiment, the ridge 542 is disposed between two tabs 540. In other embodiments, there may be more or fewer than two tabs 540 and/or more or fewer than one ridge 542, and the ridges 542 and tabs 540 may be disposed in any suitable arrangement to correspond with the corresponding recess(es) 448 and locking tab(s) 450 of the mounting component 106, to facilitate coupling of the bracing component 108 to the mounting component 106.

It should be understood that the bracing component 108 may have different configurations, shapes, and sizes than those illustrated and described herein without departing from the present disclosure. The bracing component 108 may be made of any suitable material such as, without limitation, ABS, or any other plastic, composite plastic, or thermoplastic resin. The bracing component 108 can be made in any desired color or colors, and may be transparent, translucent, or opaque.

Figure 15:
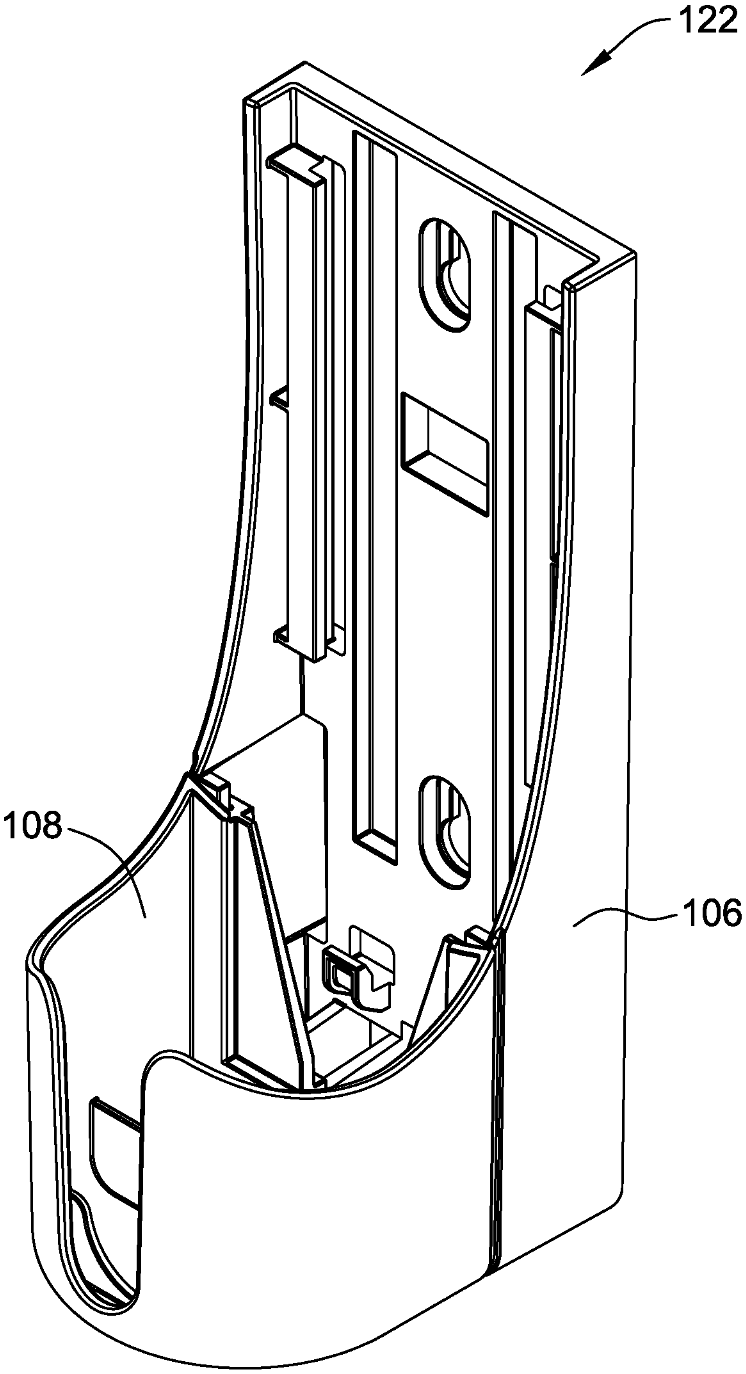
FIG. 15 is a perspective view of the dispenser assembly shown in FIG. 1 in another intermediate stage of assembly.

FIG. 15 is a perspective view of the dispenser assembly 100 shown in FIG. 1 in another intermediate stage of assembly. More particularly, a partial assembly 122 includes the bracing component 108 coupled to the mounting component 106, as described above. In one embodiment, the bracing component 108 and the mounting component 106 may be coupled together at a manufacturer location. In another embodiment, the bracing component 108 and the mounting component 106 may be coupled together during installation of the dispenser assembly 100. In one embodiment, the bracing component 108 and the mounting component 106 releasably couple together, whereas in another embodiment, the bracing component 108 and the mounting component 106 permanently couple together. The partial assembly 122 acts as a locating cradle for the partial assembly 120 (shown in FIG. 7), including the bottle 102 and the venting pump 104.

Figure 16:
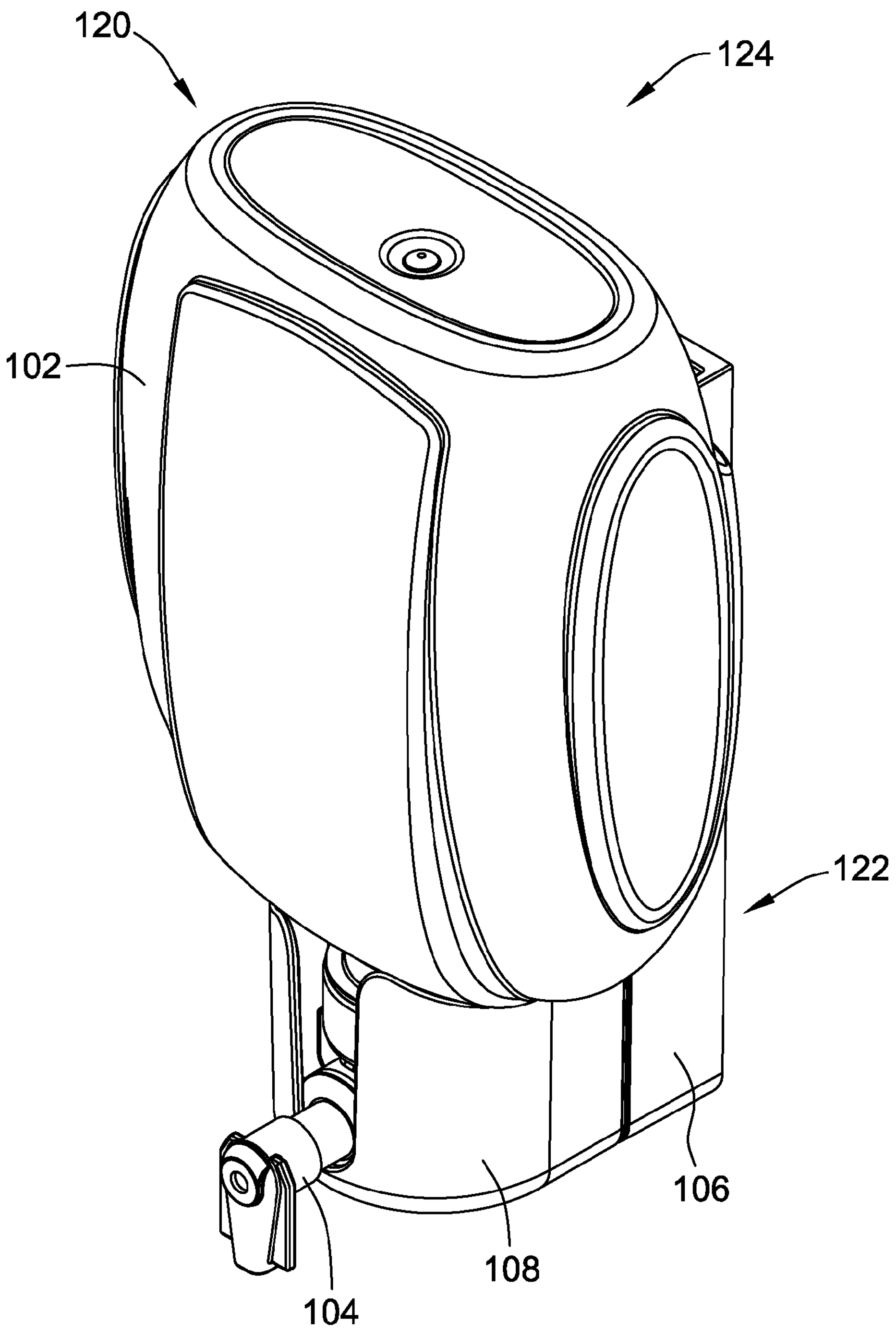
FIG. 16 is a perspective view of the dispenser assembly shown in FIG. 1 in another intermediate stage of assembly.
Figure 19:
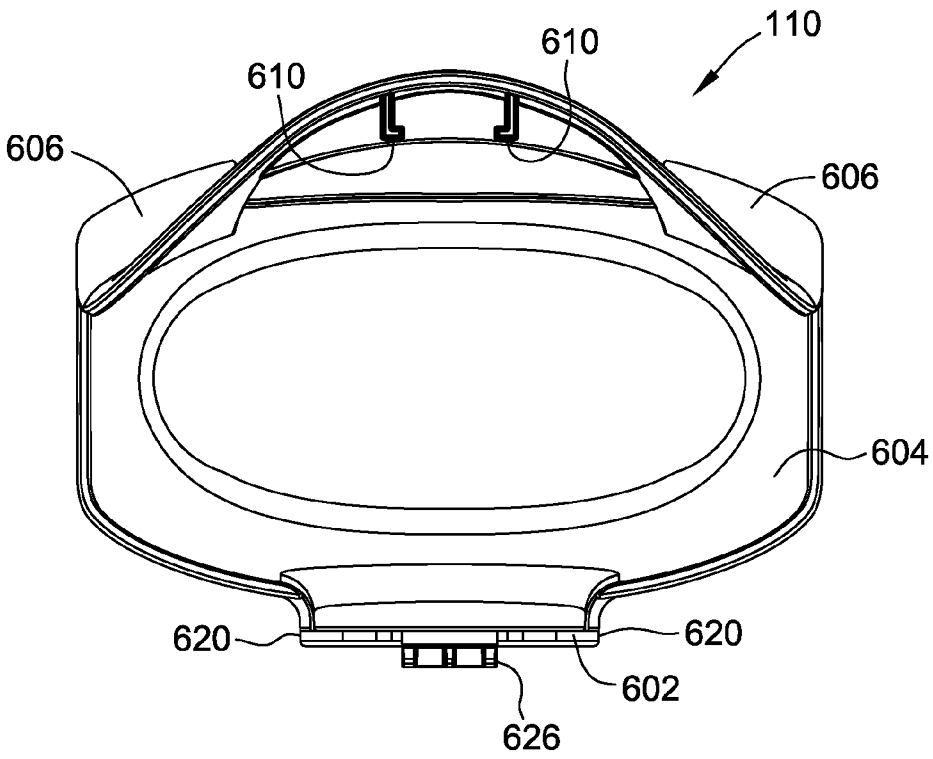
FIG. 19 is a bottom view of the enclosure shown in FIG. 17.

FIG. 16 is a perspective view of the dispenser assembly 100 shown in FIG. 1 in another intermediate stage of assembly. More particularly, FIG. 19 illustrates a partial assembly 124 including the bottle 102, the venting pump 104, the bracing component 108, and the mounting component 106. In other words, the partial assembly 124 includes the partial assembly 120 (shown in FIG. 7) coupled to the partial assembly 122 (shown in FIG. 15).

Figure 17:
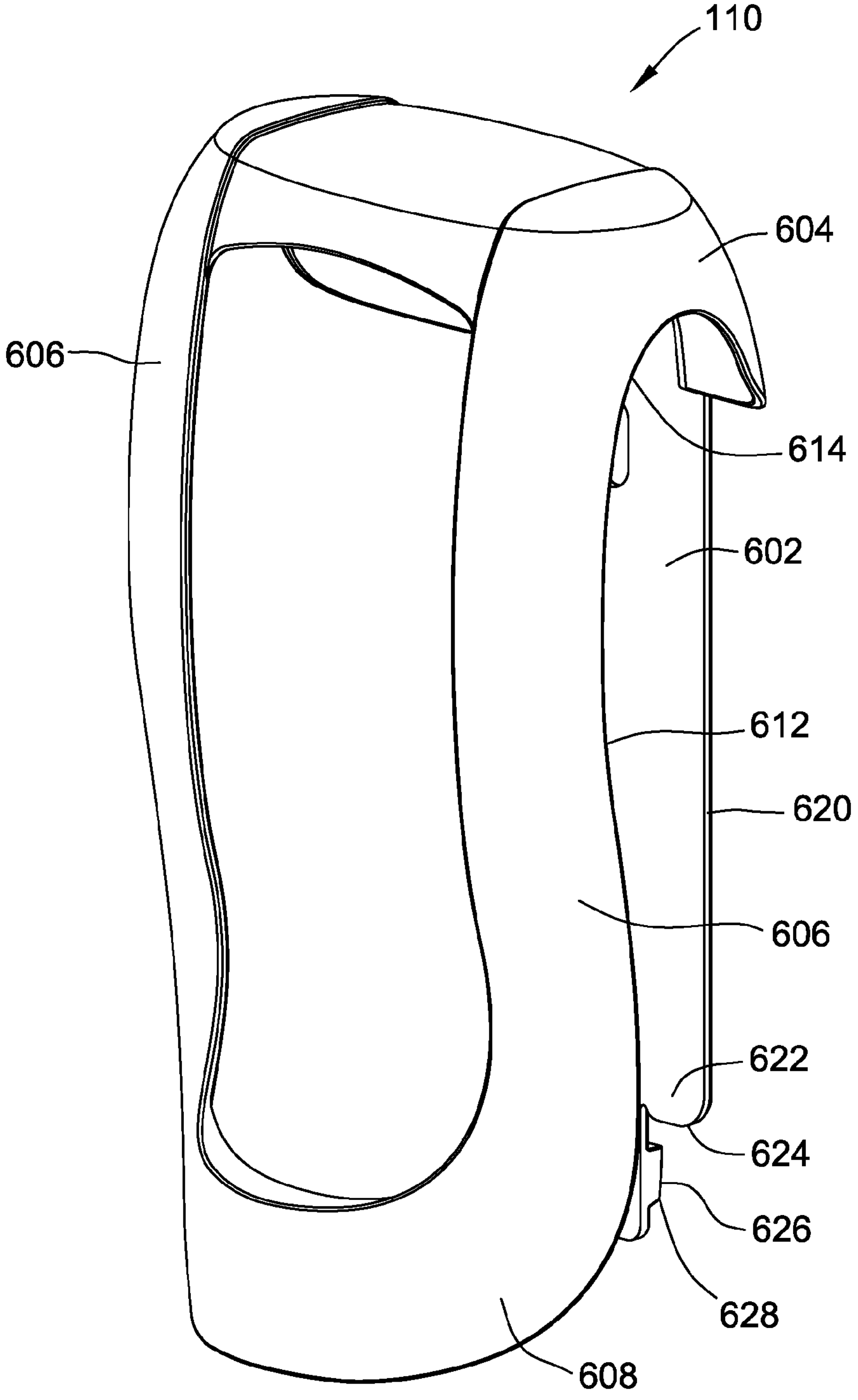
FIG. 17 is a perspective view of an enclosure that may be used with the dispenser assembly shown in FIG. 1.
Figure 18:
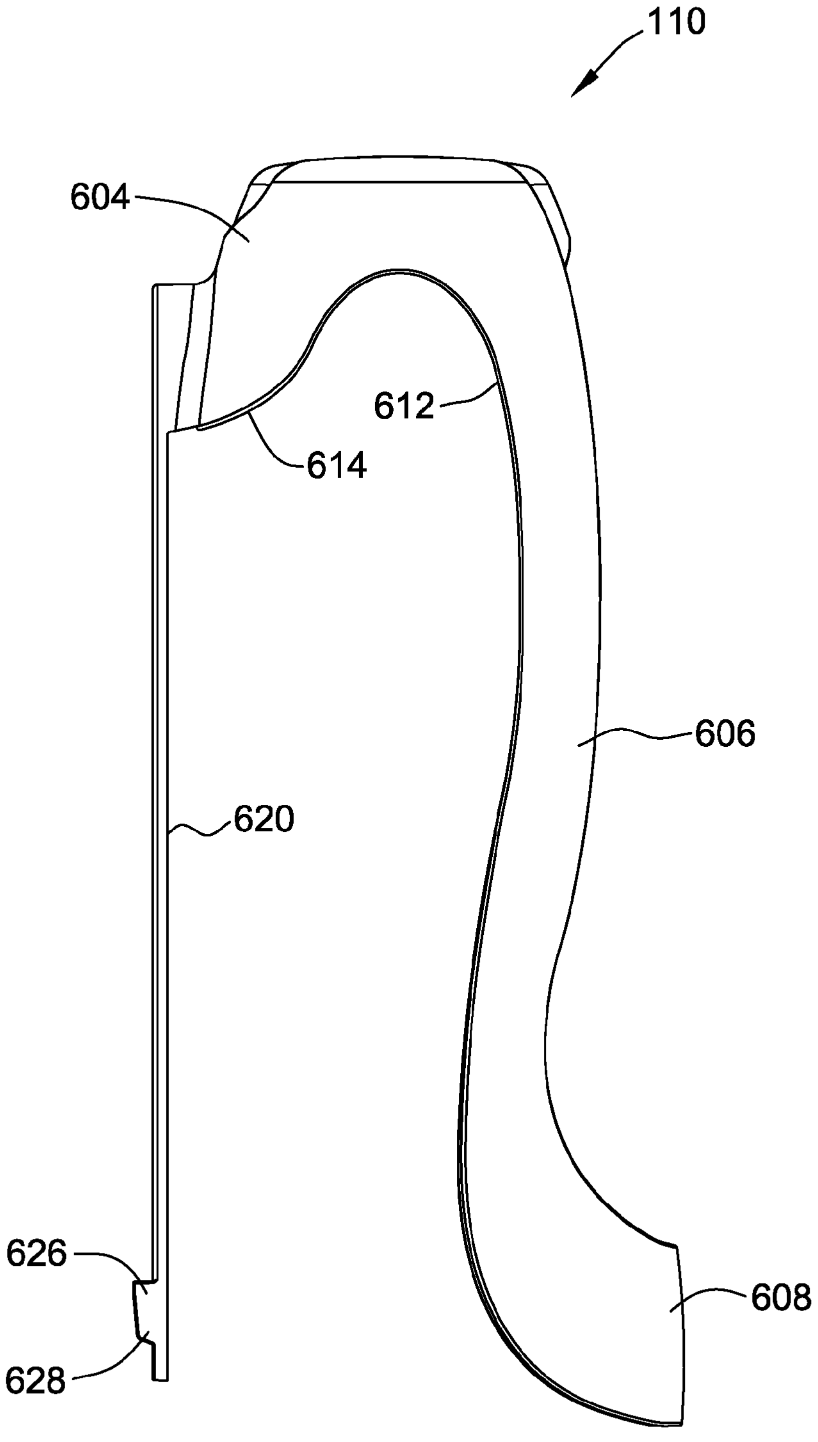
FIG. 18 is a side view of the enclosure shown in FIG. 17.

FIGS. 17-19 are various views of the enclosure 110 of the dispenser assembly 100 shown in FIG. 1. More particularly, FIG. 17 is a perspective view of the enclosure 110, FIG. 18 is a side view of the enclosure 110, and FIG. 19 is a bottom view of the enclosure 110.

The enclosure 110 includes a back wall 602 integrally formed with a top portion 604, which is itself integrally formed with at least one semi-rigid rib 606. As used herein, "semi-rigid" refers generally to a rigidity that allows a structure to maintain a predetermined form when not acted upon by a force, and that is flexible enough to bend without breaking when acted upon by a force. In the example embodiment, the enclosure 110 includes two semi-rigid ribs 606 integrally formed with and bridged by a handle portion 608. The handle portion 608 may be rigid or semi-rigid. In other embodiments, the handle portion 608 may be other than integrally formed with the semi-rigid ribs 606 and may include additional components such as a cushioning member (e.g., for cushioning a user's palm during use of the dispenser assembly 100), a sanitizing member (e.g., an anti-bacterial material and/or coating disposed thereon), and/or indicia (e.g., to direct a user to press or push on the handle, rather than pull). The enclosure 110 is configured such that, when the dispenser assembly 100 is assembled, a user may impose a pushing force on the handle portion 608, which causes the semi-rigid ribs 606 to bend slightly. Thus, the handle portion 608 may be depressed (i.e., moved inwardly, with respect to the dispenser assembly 100 as a whole) without movement of the entire enclosure 110. The back wall 602 of the enclosure 110 remains fixed with respect to the dispenser assembly 100 during operation.

The handle portion 608 of the enclosure 110 includes a pair of symmetrical brackets 610 integrally formed therewith, as best seen in FIG. 19. Each bracket 610 is configured to receive a corresponding one of the flanges 370 on the head 350 of the venting pump 104 (shown in FIGS. 4-6) when the enclosure 110 is installed on the dispenser assembly 100. The head 350 of the venting pump 104 is thereby fixed relative to the handle portion 608 of the enclosure 110, which ensures that the opening 366 (shown in FIG. 6) in the head 350 will always be directed downwards (with respect to the dispenser assembly 100), facilitating simplified and hassle-free use of the dispenser assembly 100 by a user. Moreover, the configuration of the brackets 610 about the flanges 370 of the head 350 ensures that the nozzle portion 306 (shown in FIGS. 4-6) of the venting pump 104 will be in a "ready" configuration when the enclosure 110 is in a "ready" configuration (i.e., undepressed and ready for use); and that the nozzle portion 306 will always be depressed at the same rate as the handle portion 608 of the enclosure 110. An additional benefit of the configuration of the brackets 610 about the flanges 370 of the head 350 is that a user is substantially prevented from pulling the handle portion 608 away from the nozzle portion 306, preventing user frustration and confusion about the functionality of the dispenser assembly 100. In at least some embodiments, the outlet 364 of the head 350 of the nozzle portion 306 may extend slightly past a bottom of the handle portion 608, such that product dispensed from the opening 366 of the head 350 does not contact any part of the handle portion 608.

In the example embodiment, the semi-rigid ribs 606 are spaced apart from each other to accommodate the bulge 212 of the bottle 102 (shown in FIGS. 2 and 3) when the dispenser assembly 100 is assembled. In addition, the semi-rigid ribs 606 are shaped to conform to the front 206 of the body portion 202 of the bottle 102 (also shown in FIGS. 2 and 3). The top portion 604 and the semi-rigid ribs 606 are defined by a generally elliptical outer edge 612 and a shoulder edge 614. In the example embodiment, the elliptical outer edge 612 is configured to be complementary to the generally elliptical edge 222 of the outwardly projecting rim 220 on the bottle 102 (also shown in FIGS. 2 and 3). Moreover, the shoulder edge 614 is configured to be complementary to a shape of the ridge 214 of the bottle 102 (also shown in FIGS. 2 and 3). Accordingly, when the dispenser assembly 100 is assembled, the elliptical outer edge 612 and shoulder edge 614 of the enclosure 110 are coupled substantially against, respectively, the outwardly projecting rim 220 and ridge 214 of the bottle 102. In addition, the top portion 604 and the semi-rigid ribs 606 are substantially flush with at least a portion of the body portion 202 of the bottle 102. Not only is the bottle 102 secured by the enclosure 110, but the result is aesthetically pleasing, as the dispenser assembly 100 has a substantially smooth surface.

The back wall 602 of the enclosure 110 is generally defined by two opposing side edges 620. The side edges 620 further define a pair of symmetrical extensions 622. The extensions 622 are configured to be slidably inserted into the track 420 of the mounting component 106 (shown in FIGS. 8 and 9), to install the enclosure 110 into the mounting component 106 and onto the dispenser assembly 100. Accordingly, the enclosure 110 is easily removed from and inserted into the mounting component 106 for installation and subsequent maintenance (e.g., cleaning or replacement). Each extension 622 includes a bottom edge 624. When the enclosure 110 is coupled to the mounting component 106, each bottom edge 624 couples to a corresponding bracket 426 of the mounting component 106 (also shown in FIGS. 8 and 9) to ensure accurate placement of the enclosure 110 into the mounting component 106. When each bottom edge 624 is coupled to a corresponding bracket 426, in the example embodiment, a locking tab 626 defined on the back wall 602 of the enclosure 110 is positioned to engage in a "snap fit" with the closed position locking slot 432 of the mounting component 106 (shown in FIGS. 8-10). In other words, the enclosure 110 is at its lowest position with respect to the mounting component 106, and the dispenser assembly 100 is in its closed configuration. The locking tab 626 includes an angled protuberance 628, which enables depression of the locking tab 626 by a force directed upwards (i.e., in the z direction).

It should be understood that the enclosure 110 may have different configurations, shapes, and sizes than those illustrated and described herein without departing from the present disclosure. The enclosure 110 may be made of any suitable material such as, without limitation, polycarbonate (PC), ABS, or any other plastic, composite plastic, or thermoplastic resin or combination thereof. The enclosure 110 can be made in any desired color or colors, and may be transparent, translucent, or opaque.

Figure 20:
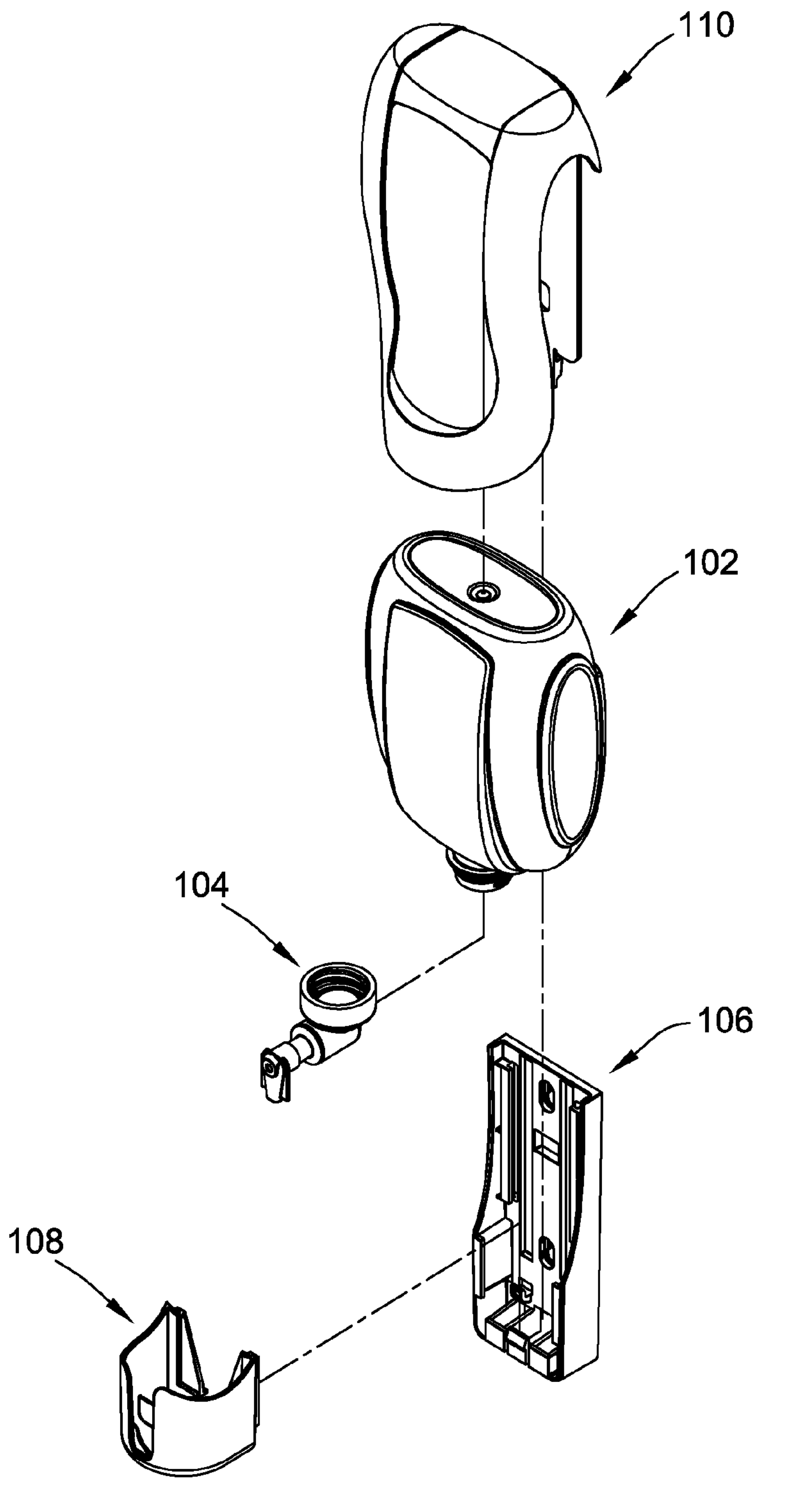
FIG. 20 is an exploded view of the dispenser assembly shown in FIG. 1.

FIG. 20 is an exploded view of the dispenser assembly 100 shown in FIG. 1. The arrows represent relative movement of the various components to assemble the dispenser assembly 100. In particular, the venting pump 104 is coupled to the bottle 102 to form the partial assembly 120 (shown in FIG. 7). The bracing component 108 is coupled to the mounting component 106 to form the partial assembly 122 (shown in FIG. 15). The partial assembly 120 is coupled to the partial assembly 122, forming the partial assembly 124 (shown in FIG. 16). Finally, the enclosure 110 is coupled to the partial assembly 124 (in particular, to the mounting component 106). It should be understood that the order described above is described for example only, and that the dispenser assembly 100 can be assembled in any other suitable order to form the dispenser assembly 100 described herein.

Figure 21:
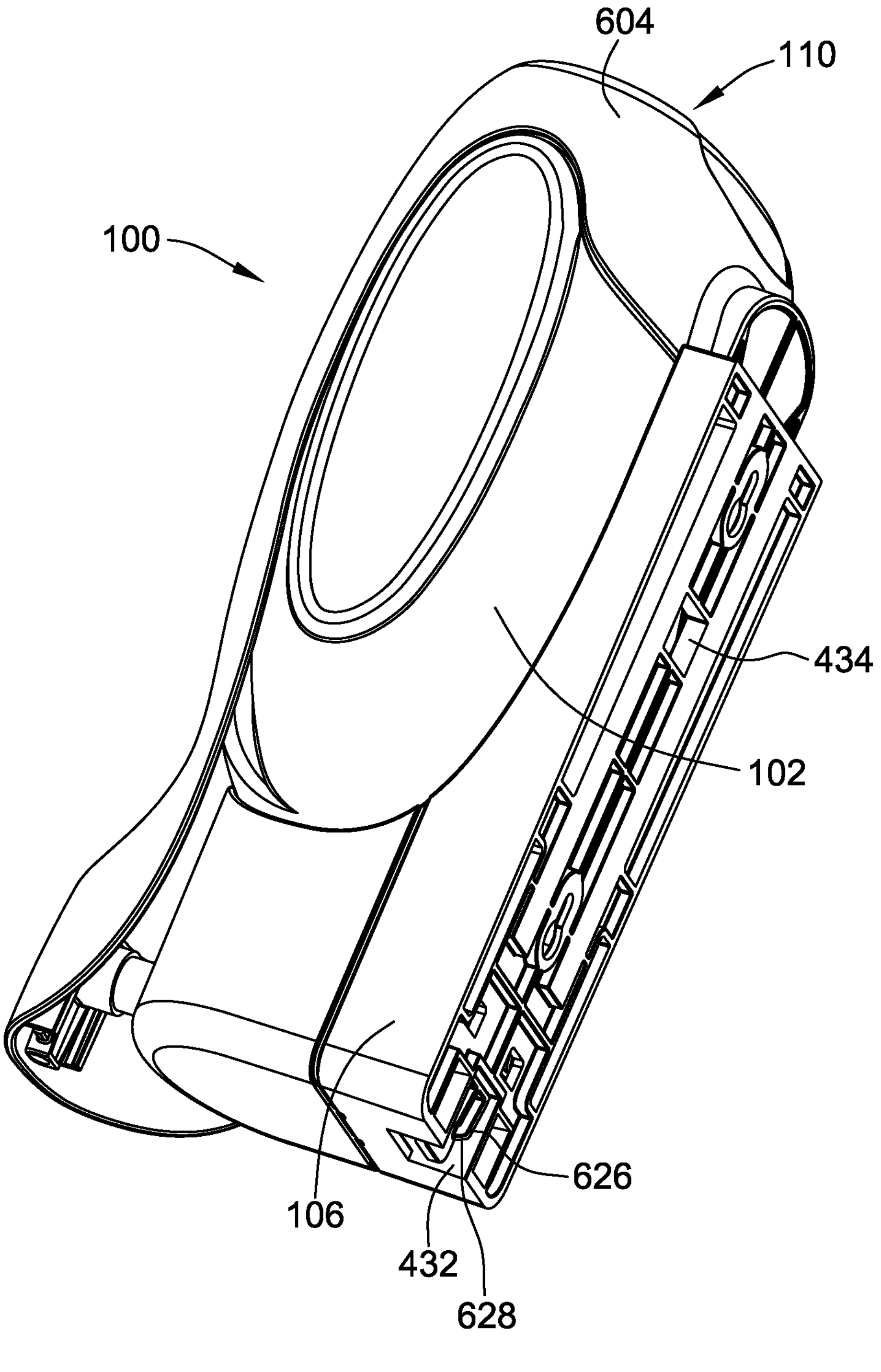
FIG. 21 is a perspective view of the dispenser assembly shown in FIG. 1 in a closed configuration.
Figure 22:
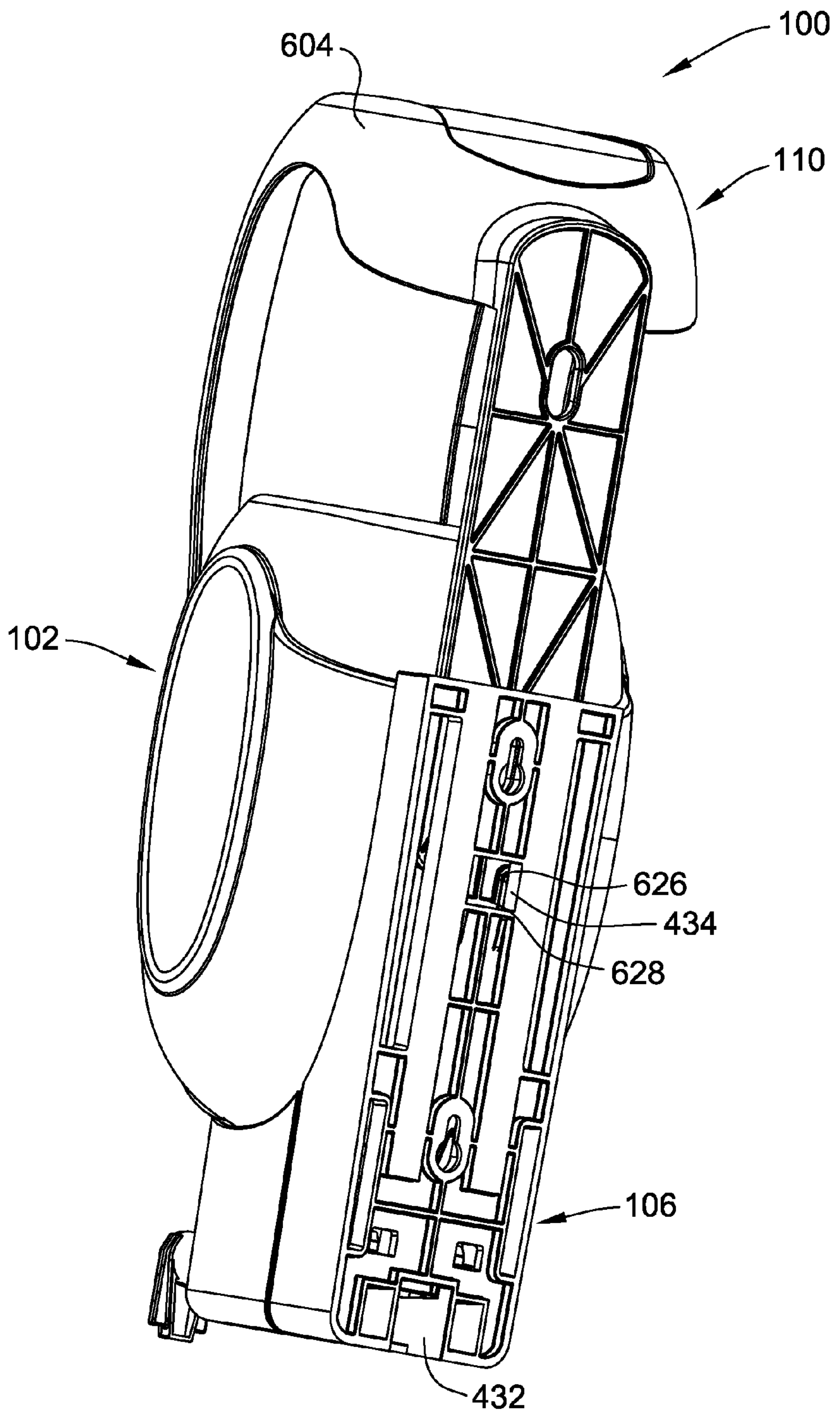
FIG. 22 is a perspective view of the dispenser assembly shown in FIG. 1 in an open configuration.

FIGS. 21 and 22 illustrate the transition of the dispenser assembly 100 from the closed configuration to the open configuration. More particularly, FIG. 21 is a perspective view of the dispenser assembly 100 shown in FIG. 1 in the closed configuration, and FIG. 22 is a perspective view of the dispenser assembly 100 shown in FIG. 1 in the open configuration. The locking tab 626 of the enclosure 110 (shown in FIGS. 17-19) is engaged with the closed position locking slot 432 of the mounting component 106 (shown in FIGS. 8-10). By depressing the locking tab 626 (i.e., moving the locking tab 626 inward, with respect to the dispenser assembly 100), the enclosure 110 is decoupled from the mounting component 106 and released from the closed configuration. The enclosure 110 may be slidably moved upwards with respect to the mounting component 106. More particularly, the extensions 622 of the enclosure 110 (also shown in FIGS. 17-19) may slide within the track 420 of the mounting component 106 (shown in FIGS. 8 and 9) until the locking tab 626 engages with the open position locking slot 434 (shown in FIGS. 8-10) to transition the dispenser assembly 100 from the closed to the open configuration. When the dispenser assembly 100 is in the open configuration, the bottle 102 is easily accessible for removal and/or refill (and/or other maintenance of the dispenser assembly 100). Accordingly, refill of the dispenser assembly 100 is simplified. The entire dispenser assembly 100 need not be removed from the wall; refill and/or other maintenance may be performed by only adjusting the enclosure 110. Further, no additional parts (e.g., keys) are needed to refill the dispenser assembly 100.

In the example embodiment, a user may return the dispenser assembly 100 to the closed configuration by applying pressure to the top portion 604 of the enclosure 110 (shown in FIGS. 17-19). This causes a bottom edge of the open position locking slot 434 to exert an upward force on the angled protuberance 628 of the locking tab 626 (shown in FIGS. 17 and 18), forcing the locking tab 626 inwards and out of engagement with the open position locking slot 434. Thereby the enclosure 110 can be moved downwards until the locking tab 626 engages with the closed position locking slot 432, (reversibly) locking the dispenser assembly 100 in the closed configuration.

Referring generally now to FIGS. 1-21, when the dispenser assembly 100 is fully assembled, all components are substantially fixed with respect to the dispenser assembly 100 as a whole, except for the handle portion 608 of the enclosure 110 and the nozzle portion 306 of the venting pump 104. To use the dispenser assembly 100, a user may place the palm of his or her hand against the handle portion 608 of the enclosure 110 and exert a pushing force thereon. The handle portion 608 is depressed inwardly with respect to the dispenser assembly 100, and the handle portion 608 engages with the head 350 of the nozzle portion 306 to depress the nozzle portion 306 inwardly as well. In the example embodiment, depressing the handle portion 608 about ¼ inch causes about 1 mL of fluid to be dispensed from the opening 366 of the nozzle portion 306 into the hand of the user. The user need not contact any part of the nozzle portion 306 in order to receive dispensed product.

It is contemplated that a user may exert the pushing force on the handle portion 608 using means other than the palm of his or her hand. For example, a user may use his or her fingers, fist, elbow, or forearm to dispense a product into a receptacle (e.g., a handle, a bottle, or any other receptacle).

As such, the embodiments disclosed herein may be easier to use than traditional dispensers for people with various disabilities and may be compliant with the Americans with Disabilities Act (ADA). The examples described herein are not meant to limit use of the dispenser assembly 100 to a particular embodiment or product.

Embodiments of the disclosure may provide advantages such as, for example, a minimal design that reduces waste of the liquid product by enabling more precise control of the dispensed product, and also reduces manufacture, maintenance, and/or replacement costs. The minimal design described herein also enhances the aesthetic appeal of the dispenser assembly 100. In addition, the materials used in the manufacture of the bottle 102 may be more environmentally friendly than at least some known bottles. The dispenser assembly 100 described herein provides full visibility of the bottle (e.g., bottle 102), eliminating the need for a sight window for determination of when a refill is needed. Further, the mounting component 106 is easily installed and allows for simple installation of the entire dispenser assembly 100. Moreover, the dispenser assembly 100 has a low profile such that it can be installed in a variety of locations, promoting ease of access and hand hygiene compliance.

Further advantages includes that refill bottles (e.g., a bottle 102) designed to be used with the dispenser assembly 100 may also be used in a stand-alone configuration with a traditional pump, as described above, which enables the unification of a design aesthetic when using a stand-alone bottle 102 in combination with the dispenser assembly 100. Moreover, the design of the dispenser assembly 100 enables the use of a wide variety of liquid refill products without the need to exchange any components of the dispenser assembly 100 other than the bottle 102. Personalization of the dispenser assembly 100 is also simple, in that replacement/exchange of the enclosure 110 (e.g., an enclosure 110 of a new color or pattern) is easily performed without need to replace/exchange any other components of the dispenser assembly 100.

When introducing elements of the present disclosure or the embodiment(s) thereof, the articles “a”, “an”, “the” and “said” are intended to mean that there are one or more of the elements. The terms “comprising”, “including” and “having” are intended to be inclusive and mean that there may be additional elements other than the listed elements. Like references in the figures indicate like elements, unless otherwise indicated.

As various changes could be made in the above without departing from the scope of the disclosure, it is intended that all matter contained in the above description and shown in the accompanying drawings shall be interpreted as illustrative and not in a limiting sense.

What is claimed is:

1. A method of assembling a dispenser assembly for dispensing a liquid product, the method comprising:

connecting a venting pump to a bottle configured to store the product, the venting pump configured to control dispensing of the product from the bottle;

connecting an enclosure in an open configuration to a mounting component;

inserting the bottle into the enclosure while the enclosure is in the open configuration; and moving the enclosure relative to the mounting component to transition the enclosure into a closed configuration that secures the bottle within the enclosure;

wherein connecting an enclosure comprises connecting an enclosure that includes a top portion, a pair of ribs extending from the top portion, and a handle portion extending between the pair of ribs, and wherein inserting the bottle comprises inserting a bottle that includes a bulge sized to be positioned within an aperture defined by the top portion, the pair of ribs, and the handle portion.

2. A method in accordance with claim 1, wherein connecting an enclosure comprises connecting an enclosure that includes a pair of symmetrical brackets that directly engage corresponding flanges on the venting pump.

3. A method in accordance with claim 1, further comprising connecting a bracing component to the mounting component, the bracing component including an arcuate wall and a plurality of joists that engage and support the venting pump.

4. A method in accordance with claim 1, wherein inserting the bottle comprises inserting a bottle that includes a neck portion that engages the venting pump, and a top opposite the neck portion, wherein the top is substantially flat such that the bottle is invertible and capable of being stood on a flat surface in an inverted position.

5. A method in accordance with claim 1, wherein connecting a venting pump to a bottle comprises connecting a venting pump that includes a collar portion, the collar portion having a plurality of vent holes defined therein that form a vent path, the vent path allowing ambient air to flow into and out of the bottle when the product is dispensed from the bottle.

6. A method in accordance with claim 1, wherein connecting an enclosure to a mounting component comprises engaging two tracks formed on the mounting component with corresponding extensions formed on the enclosure, each track including a side face and a lip extending perpendicularly from the side face.

* * * * *